United States Patent [19]

Stern et al.

[11] Patent Number: 5,451,982
[45] Date of Patent: Sep. 19, 1995

[54] STILL STORE SYSTEM AND METHOD WITH SIMPLE IMAGE ACCESS

[75] Inventors: John Stern, Menlo Park; Luigi Gallo, Woodside; Douglas J. George, Sunnyvale; Junaid Sheikh, Woodside, all of Calif.

[73] Assignee: Accom, Inc., Menlo Park, Calif.

[21] Appl. No.: 902,753

[22] Filed: Jun. 23, 1992

Related U.S. Application Data

[63] Continuation of Ser. No. 502,421, Mar. 30, 1990, abandoned.

[51] Int. Cl.[6] .............................................. G09G 1/02
[52] U.S. Cl. .................................... 345/127; 345/185; 395/164
[58] Field of Search ............................ 382/47, 56, 59; 395/164; 348/458; 345/185, 127

[56] References Cited

U.S. PATENT DOCUMENTS

| | | | |
|---|---|---|---|
| 4,581,761 | 4/1986 | Ichinokawa et al. | 382/59 X |
| 4,652,921 | 3/1987 | Rae-Smith. | |
| 4,763,208 | 8/1988 | Kawamura et al. | |
| 4,777,525 | 10/1988 | Preston, Jr. | |
| 4,881,069 | 11/1989 | Kameda et al. | 382/47 X |

FOREIGN PATENT DOCUMENTS

| | | |
|---|---|---|
| 0051228 | 5/1982 | European Pat. Off. |
| 0157539 | 10/1985 | European Pat. Off. |
| 0176290 | 4/1986 | European Pat. Off. |
| 0310829 | 4/1989 | European Pat. Off. |
| 63-078687 | 8/1988 | Japan. |

*Primary Examiner*—Ulysses Weldon
*Attorney, Agent, or Firm*—Flehr, Hohbach, Test, Albritton & Herbert

[57] ABSTRACT

A digital still store system (10) receives composite digital 4:2:2 D1 video signal inputs in parallel at (12) or serially at (14). The signals are supplied in component form selectively to one of framestores (18) and (20). The component signals are supplied from the framestores (18) and (20) to hard disks (22) through a buffer store (24) and disk input/output (I/O) circuits (26). Each of the hard disks (22) stores still video images as either 525 or 625 line digital frames for either NTSC or PAL composite signal inputs and outputs. Y and C fields of component video signal information are supplied from the hard disks (22) through the buffer store (24) and one of the frame stores 18 and 20 to a compositor (28) for output as digital 4:2:2 video signals. The buffer store (24) obtains the video signal fields for either full size images or ¼ size images, when an array for browsing and selection is desired. When the ¼ size images are desired, the field video signals are obtained by addressing every fourth pixel of the field for readout.

21 Claims, 17 Drawing Sheets

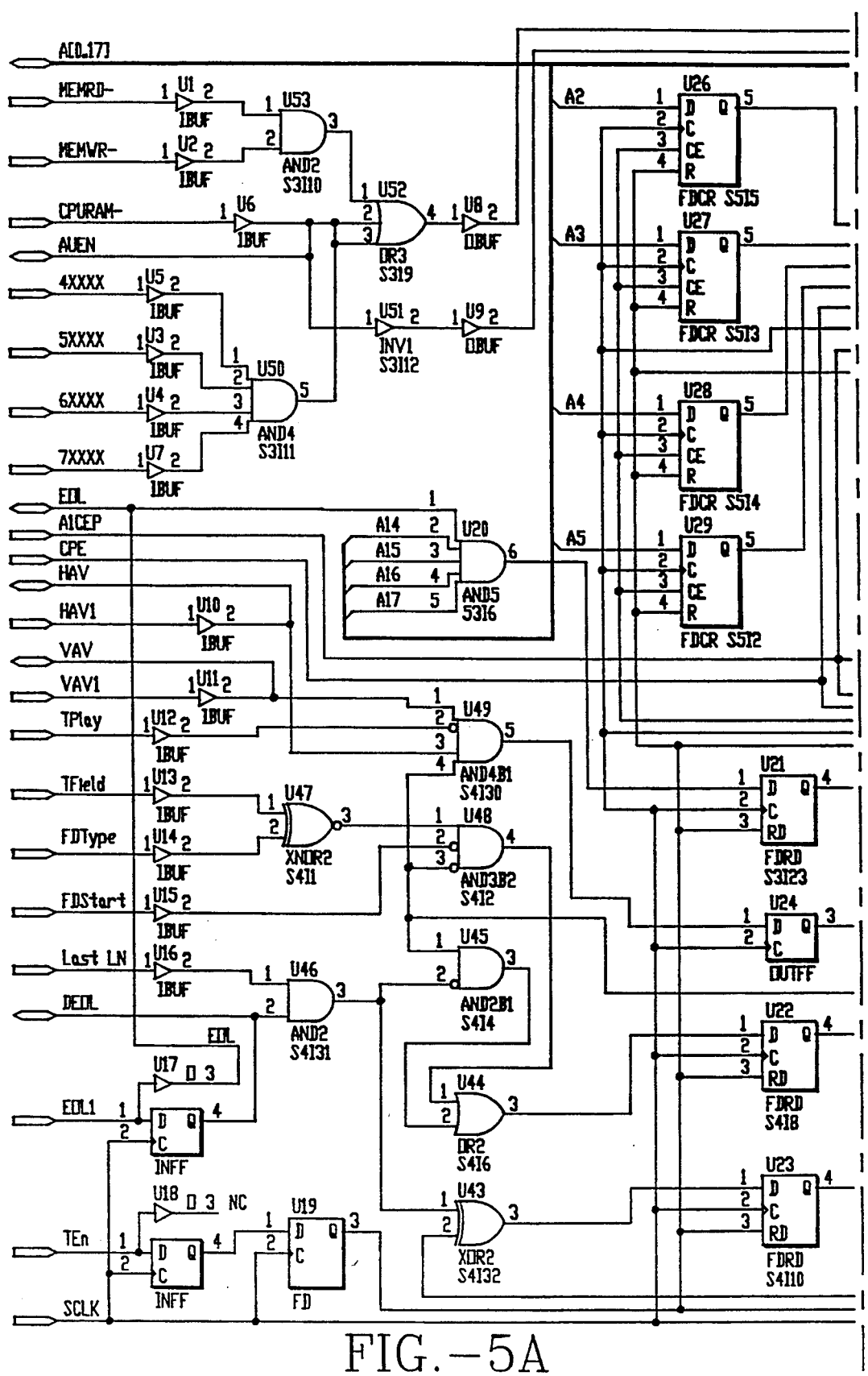
FIG.−5A

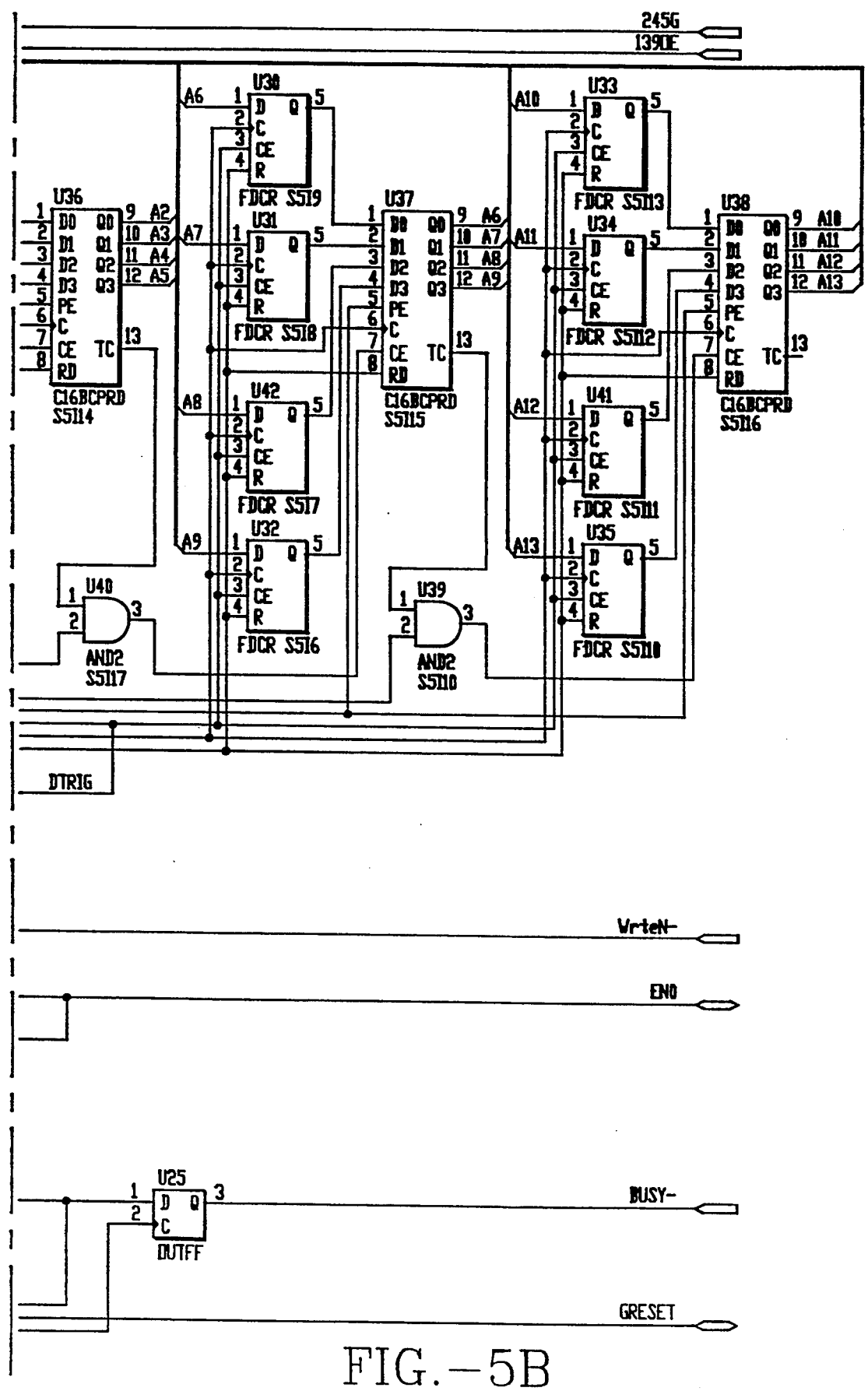
FIG.—5B

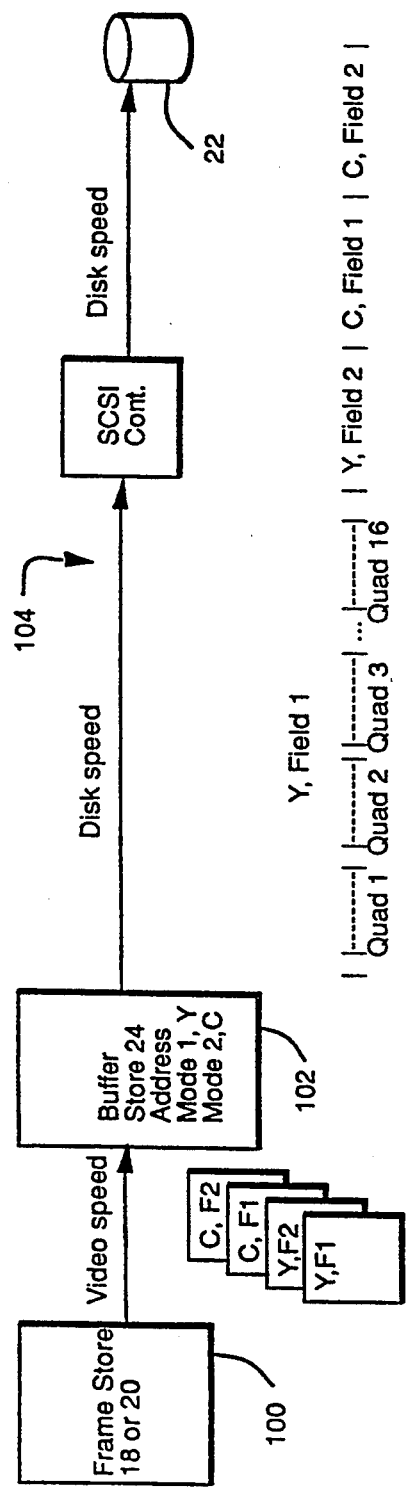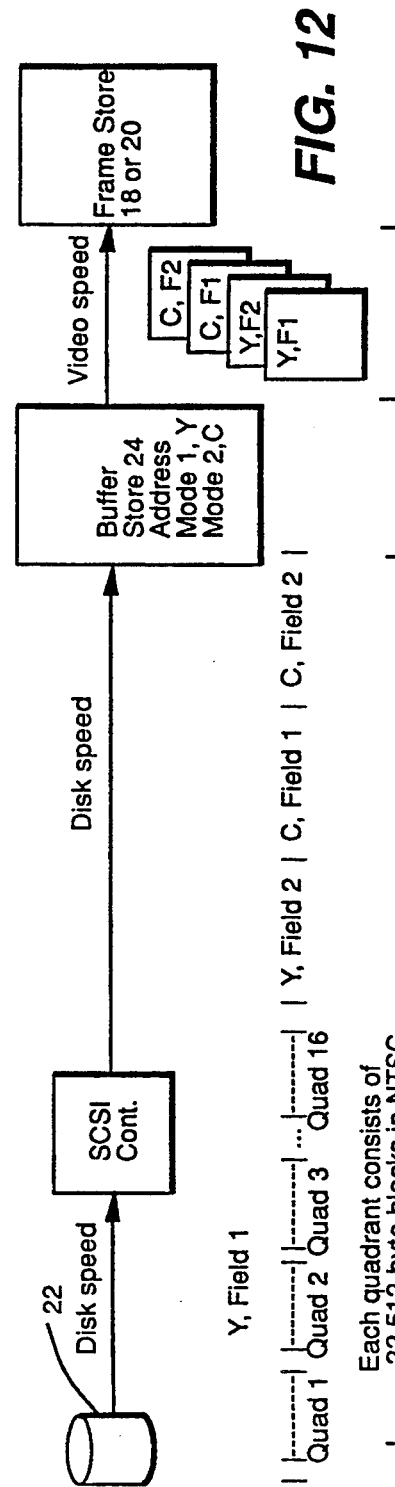
FIG. 11
FIG. 12

STILL STORE SYSTEM AND METHOD WITH SIMPLE IMAGE ACCESS

This is a continuation of application Ser. No. 07/502,421 filed Mar. 30, 1990 now abandoned.

BACKGROUND OF THE INVENTION

1. Field of the Invention

The present invention relates generally to an electronic system and method for storing and retrieving information representing a multiplicity of video image frames. More particularly, it relates to such a system and method in which a data processing operation is not required to store the video image frames and to retrieve them for display in either their full size or as a set of reduced-size images displayed together, such as for browsing and selection. Most especially, it relates to such a system and method providing visual and electronic color comparison and an easy to use control system.

2. Description of the Prior Art

Systems called still stores for storing and retrieving a multiplicity of single frame still images to and from, for example, disk drives, are known in the art. For example, such systems are disclosed in Taylor et al., U.S. Pat. No. 4,302,776, issued Nov. 24, 1981 and Beaulier, U.S. Pat. No. 4,821,121, issued Apr. 11, 1989. In the use of such systems, it is common to browse through the stored images in order to select a particular image for further processing. When making such a selection, it is highly desirable to show a number, for example, sixteen of the images simultaneously to allow side-by-side comparison of them.

In the still store as described by Taylor et al., when a user wants to change the size of stored full size images to allow their display as an array of reduced size images, an image processor must process the image data after retrieving it from disk storage to generate the reduced size images. Taylor et al. were able to reduce system complexity over prior still store systems in which the image processing was carried out in real video time by doing the image processing in non-real time. However, the necessity to carry out such image processing whenever simultaneous display of reduced size images was desired means that a substantial system complexity is still required.

In the still store described by Beaulier, the need to carry out processing of the image data each time for simultaneous display of reduced size images is eliminated by carrying out the image processing for size reduction on each full size image prior to storing the full size image for the first time. The reduced and full size images are then stored together on the disk storage for later accessing. Another system in which both full size images and reduced size images are stored is disclosed in Belmares-Sarabia et al., U.S. Pat. No. 4,763,186, issued Aug. 9, 1988. However, this approach does not eliminate all image data processing for reduced size image display, and it also requires the storage of additional information on the disk.

SUMMARY OF THE INVENTION

Accordingly, it is an object of this invention to provide a still store system and method which does not require image data processing for display of reduced size images.

It is another object of the invention to provide such a still store system and method which does not require storage of images in both full size and reduced size in order to allow selective display of reduced size images.

It is a further object of the invention to provide such a still store system and method allowing convenient visual color comparison of images.

It is still another object of the invention to provide such a still store system and method allowing convenient electronic color comparison of images.

It is a still further object of the invention to provide such a still store system and method with an easy to use control system.

The attainment of these and related objects may be achieved through use of the novel still store system and method with simple image access herein disclosed. A still store system in accordance with this invention for storing and retrieving information representing a multiplicity of video image frames consisting of a plurality of pixels has at least one framestore connected to a video image signal input. At least one bulk video image signal store stores a plurality of video images. A buffer store is connected to supply video image signals between the at least one framestore and the at least one bulk video image signal store. The buffer store is connected to receive the video image signals from the at least one framestore. The buffer store has an address control for selectively retrieving the video image signals for full-size video image frames by addressing sequential addresses and reduced-size images by addressing one of a given number of the plurality of pixels in the full-size video image frames, to provide output video signals selectively for the full-size video image frames and an array of the reduced-size images as an image frame.

A method for storing still images in accordance with this invention consisting of a plurality of pixels includes receiving video image signals defining the video image frames in at least one framestore. The video image signals are stored in a bulk storage means. The video image signals are retrieved from the bulk storage means selectively as full-size video image frames by addressing sequential addresses and reduced-size images by addressing one of a given number of the plurality of pixels in the full-size video image frames. Output video signals are provided selectively for the full-size video image frames and for the reduced-size images as an image frame.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIGS. 4, 5A, 5B, 6A, 6B, 7, 8A, 8B, 9A, 9B, and 9C are circuit schematic diagrams of another portion of the still store system of FIGS. 1 and 2.

FIGS. 10, 11, 12 and 13 are flow chart representations useful for understanding operation of the still store system of FIGS. 1 and 2.

DETAILED DESCRIPTION OF THE INVENTION

Figure 1:
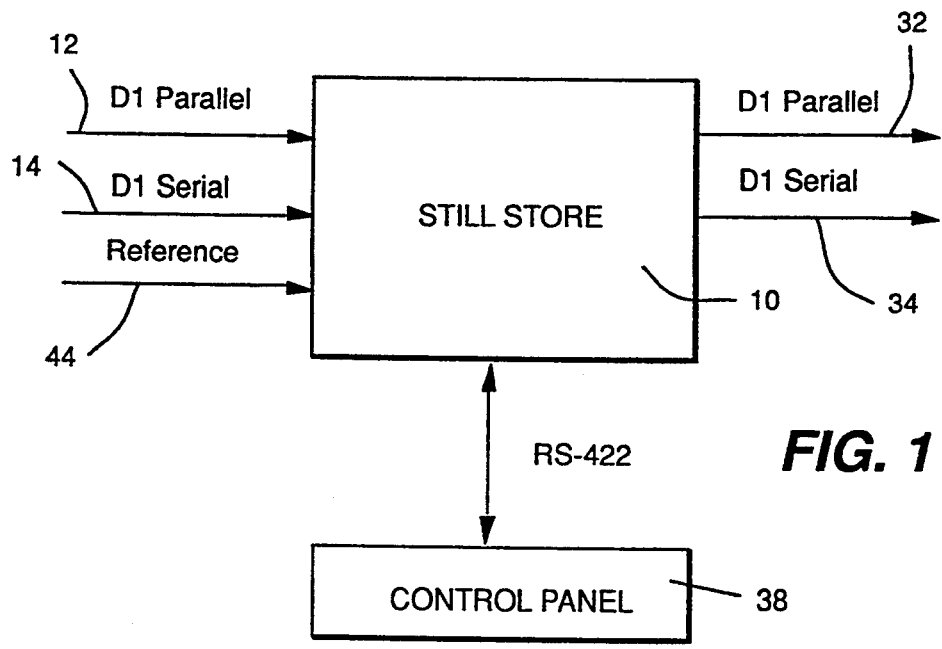
FIG. 1 is a generalized block diagram of a still store system in accordance with the invention.
Figure 2:
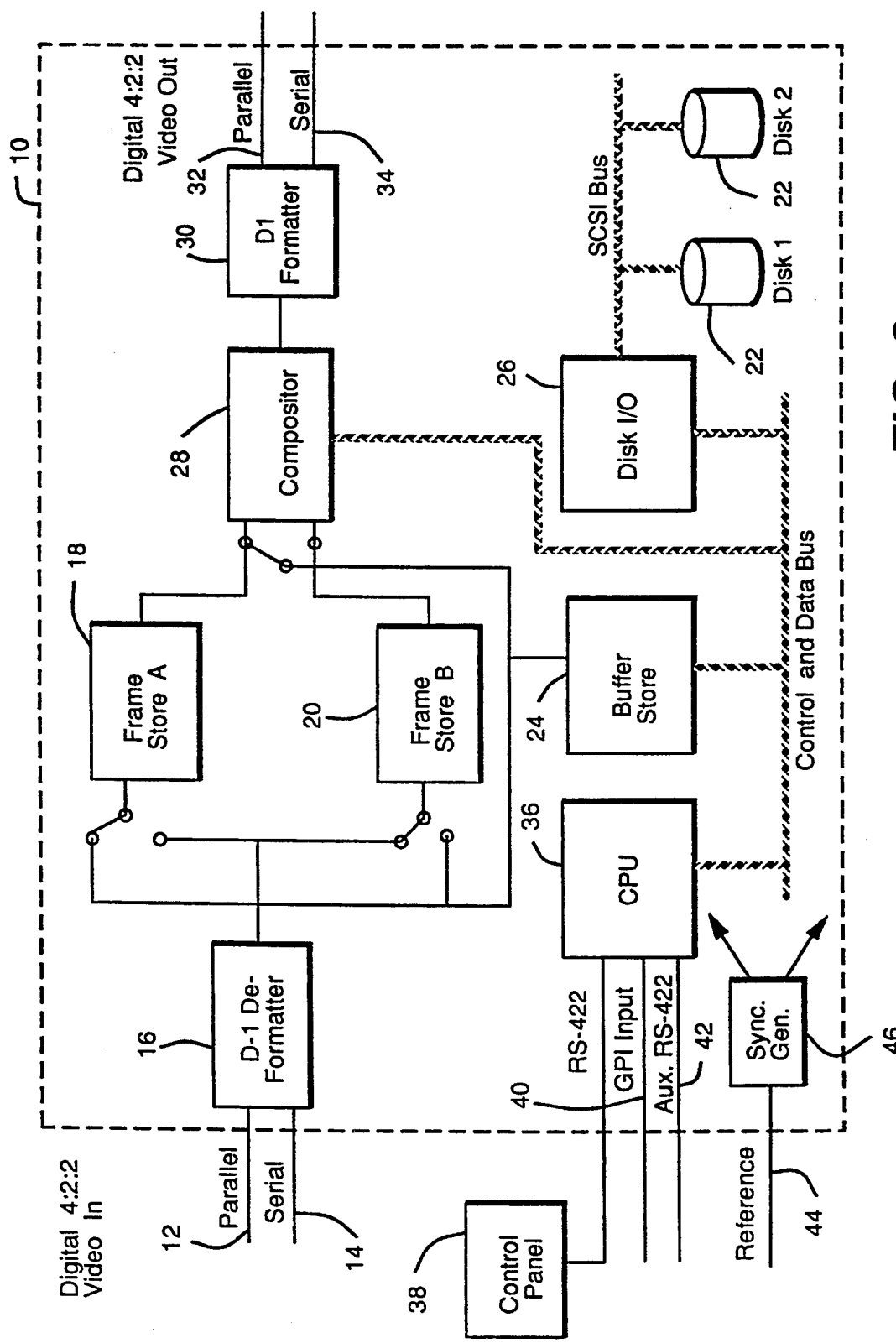
FIG. 2 is a more detailed block diagram of the still store system of FIG. 1.

Turning now to the drawings, more particularly to FIGS. 1 and 2, there is shown a digital still store system 10, which receives composite digital 4:2:2 D1 signal inputs in parallel at 12 or serially at 14. A D1 signal deformatter 16 separates the D1 signals into their luminance (Y) and chrominance ($C_R$) and ($C_B$) components and supplies the signals in component form alternatively to framestores 18 and 20. The component signals are supplied from the framestores 18 and 20 to hard disks 22 through a buffer store 24 and disk input/output (I/O) circuits 26. The two framestores 18 and 20 are used for allowing real time wipe between two images and handling other situations involving two images. Each of the hard disks 22 has a capacity to store 100 still video images as either 525 or 625 line digital frames for either NTSC or PAL component signal inputs and outputs.

Y, $C_R$ and $C_B$ fields of component video signal information are supplied from the hard disks 22 through the buffer store 24 to a framestore 18 or 20, to a compositor 28 for output as digital 4:2:2 video signals through a D1 formatter 30 at 32 and 34. The formatter 30 combines the component Y, $C_R$ and $C_B$ fields into frames of component video signals. Fields of component video information can also be supplied directly to the compositor 28 from the framestores 18 and 20.

System operation is controlled by a central processing unit (CPU) 36, desirably implemented as a control oriented microprocessor, such as an NEC V40 microprocessor. User inputs are provided to the CPU 36 from a control panel 38 through a serial RS-422 communications link. Additional inputs to the CPU 36 can be provided at 40 and 42. For example, the RS-422 input 42 can be used for external control of the system 10. This input 42 can be used to provide additional information about images for storage with the video image signals, such as a name for an image or a time code. A reference input at 44 is supplied to a synchronizing pulse generator 46. The CPU 36 runs a suitable system control program, stored in a read only memory (ROM), not shown.

In operation, the framestores 18 and 20 change addressing of the field video signals in one field time into the buffer store 24, which then writes the signals to one of the disks 22. For playback, the buffer store obtains the video signal fields for either full size images or ¼ size images, when an array for browsing and selection is desired. When the ¼ size images are desired, the field video signals are obtained by addressing every fourth pixel of the field for readout.

Figure 3:
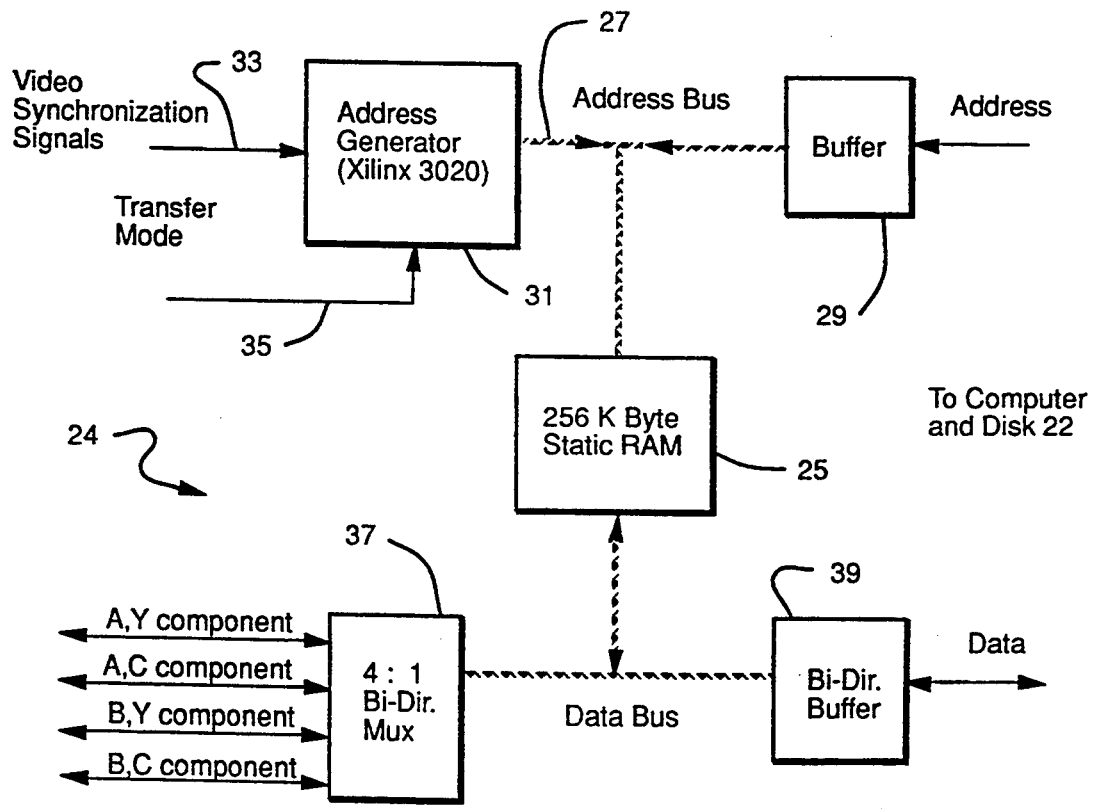
FIG. 3 a more detailed block diagram of a portion of the still store system of FIGS. 1 and 2.

FIG. 3 shows details of the buffer store 24. A 256 KByte static random access memory (RAM) 25 receives address inputs on address bus 27. The addresses are supplied from CPU 36 through buffer circuit 29 and from a Xilinx 3020 address generator integrated circuit 31 from video synchronization and transfer mode inputs at 33 and 35. Data is supplied to and from the RAM 25 by framestores 18 and 20 through a 4:1 bidirectional multiplexer 37. Data is also supplied to and from the RAM 25 by disks 22 through bidirectional buffer circuit 39.

The buffer store 24 is a mechanism for interfacing information at fast (video) rates to slow (computer) rates. It is also used to modify the order that information passes through it to effect an apparent video image size reduction, but without the need for data processing.

At any instant, the buffer store 24 may perform one and only one of the following activities:
1) transfer one field of one component from either framestore 18 or 20 into the buffer store 24.
2) transfer one field of one component from the buffer store 24 into either framestore 18 or 20.
3) transfer information to or from the disks 22.
4) nothing.

Activities 1) and 2) above entail data access in a predetermined order, since the framestores 18 and 20 are sequential access. In 1) and 2) above, the address generator 31 may modify the sequence of addresses in order to store the information in a convenient way on the disk such that, when a "browse" image is brought up, the individual, small ¼ size pictures may be retrieved quickly.

There are four modes of address modification, one for each of the following tasks:
1) Transferring a full-size image, Y component, between the framestore 18 or 20 Y section and the buffer store 24 in either direction.
2) Same as 1), but for a C component.
3) Transferring 16 reduced-size "browse" images from the buffer store 24 to the framestore 18 or 20. This is the same for Y and C components. Note that this information flows one way only.
4) "Linear" mode, without modification. Useful for transferring a full-size image to or from the buffer store 24 so that the CPU 36 can easily access the information without having to cope with a "scrambled" version of the image.

Address mode 3) above differs between 525-line systems (NTSC) and 625-line systems (PAL). The other three modes are the same for both video standards. Tables 1 and 2 show the addresses for full size image Y and C field video signals as stored and the addresses for read out of ¼ size images for NTSC and PAL video signal outputs. The sequence of addresses for modes 1)-2) is shown in Table 1. Mode 1) is on the left side, Mode 2) on the right. Each cell in the table contains the address before modification at the bottom and the modified address at the top. The idea is to form, for each field of each component, 16 quadrants each of 22 blocks of 512 bytes (NTSC only). Each quadrant is a reduced-size version of the original. A quadrant accessed individually represents a 1/16 (areal) version of the original image. By putting all 16 quadrants together, the entire image is reconstituted without loss.

The sequence for mode 3) is shown in Table 2. It is similar in form. 525-line operation is at the left, 625-line at the right. The sequence for mode 4) is not shown because it is so simple; each cell in its table would contain identical top and bottom numbers.

TABLE 1

| | Y Channel < 180 columns > | | | | | | C Channel < 180 columns > | | | | |
|---|---|---|---|---|---|---|---|---|---|---|---|
| #1 | 0 | 1 | 2 | ... | 179 | #1 | 0 | 1 | 2 | ... | 179 |
| | 0 | 4 | 8 | ... | 716 | | 0 | 1 | 8 | ... | 713 |
| | 180 | 181 | 182 | ... | 359 | | 180 | 181 | 182 | ... | 359 |
| | 2880 | 2881 | 2882 | ... | 3596 91.02 | | 2880 | 2881 | 2882 | ... | 3593 91.02 |
| | 360 | 361 | 362 | ... | 539 rows | | 360 | 361 | 362 | ... | 539 rows |

TABLE 1-continued

| | Y Channel < 180 columns > | | | | | | | C Channel < 180 columns > | | | | | |
|---|---|---|---|---|---|---|---|---|---|---|---|---|---|
| | 5760 | 5764 | 5768 | ... | 6476 | | | 5760 | 5761 | 5768 | ... | 6473 | |
| | ... | ... | ... | ... | ... | | | ... | ... | ... | ... | ... | |
| | 163800 | 16381 | 16382 | ... | — | | | 163800 | 16381 | 16382 | ... | — | |
| | 178560 | 176564 | 178568 | ... | — | v | | 178560 | 178561 | 178568 | ... | — | v |
| #2 | 16384 | 16385 | 16386 | ... | 16563 | | #2 | 16384 | 16385 | 16386 | ... | 16563 | |
| | 1 | 5 | 9 | ... | 717 | | | 2 | 3 | 10 | ... | 715 | |
| | 16564 | 16565 | 16566 | ... | 16743 | 91.02 | | 16564 | 16565 | 16566 | ... | 16743 | 91.02 |
| | 2881 | 2885 | 2889 | ... | 3597 | rows | | 2882 | 2883 | 2890 | ... | 3595 | rows |
| | 16744 | 16745 | 16746 | ... | 16923 | | | 16744 | 16745 | 16746 | ... | 16923 | |
| | 5761 | 5765 | 5769 | ... | 6477 | | | 5762 | 5763 | 5770 | ... | 6475 | |
| | ... | ... | ... | ... | ... | | | ... | ... | ... | ... | ... | |
| | 32764 | 32765 | 32766 | ... | — | | | 32764 | 32765 | 32766 | ... | — | |
| | 178561 | 178565 | 178569 | ... | — | v | | 178562 | 178563 | 178570 | ... | — | v |
| #3 | 32768 | 32769 | 32770 | ... | 32947 | | #3 | 32768 | 32769 | 32770 | ... | 32947 | |
| | 2 | 6 | 10 | ... | 718 | | | 4 | 5 | 12 | ... | 717 | |
| | 32948 | 32949 | 32950 | ... | 33127 | | | 32948 | 32949 | 32950 | ... | 33127 | |
| | 2882 | 2886 | 2890 | ... | 3598 | 91.02 | | 2884 | 2885 | 2892 | ... | 3597 | 91.02 |
| | 33128 | 33129 | 33130 | ... | 33307 | rows | | 33128 | 33129 | 33130 | ... | 33307 | rows |
| | 5762 | 5766 | 5770 | ... | 6478 | | | 5764 | 5765 | 5772 | ... | 6477 | |
| | ... | ... | ... | ... | ... | | | ... | ... | ... | ... | ... | |
| | 49148 | 49149 | 49150 | ... | — | | | 49148 | 49149 | 49150 | ... | — | |
| | 178562 | 178566 | 178570 | ... | — | v | | 178464 | 178565 | 178572 | ... | — | v |
| #4 | 49152 | 49153 | 49154 | ... | 49331 | | #4 | 49152 | 49153 | 49154 | ... | 49331 | |
| | 3 | 7 | 11 | ... | 719 | | | 6 | 7 | 14 | ... | 719 | |
| | 49332 | 49333 | 49334 | ... | 49511 | | | 49332 | 49333 | 49334 | ... | 49511 | |
| | 2883 | 2887 | 2891 | ... | 3599 | 91.02 | | 2886 | 2887 | 2894 | ... | 3599 | 91.02 |
| | 49512 | 49513 | 49514 | ... | 49691 | rows | | 49512 | 49513 | 49514 | ... | 49691 | rows |
| | 5763 | 5757 | 5771 | ... | 6479 | | | 5766 | 5767 | 5774 | ... | 6479 | |
| | ... | ... | ... | ... | ... | | | ... | ... | ... | ... | ... | |
| | 6552 | 65533 | 65534 | ... | — | | | 65532 | 65533 | 655345 | ... | — | |
| | 178563 | 178567 | 178571 | ... | — | v | | 178566 | 178567 | 178574 | ... | — | v |
| #5 | 65536 | 65537 | 65538 | ... | 65715 | | #5 | 65536 | 65537 | 65538 | ... | 65715 | |
| | 720 | 724 | 728 | ... | 1436 | | | 720 | 721 | 728 | ... | 1433 | |
| | 65716 | 65717 | 65718 | ... | 65895 | | | 65716 | 65717 | 65718 | ... | 65895 | |
| | 3600 | 3605 | 3608 | ... | 4316 | 91.02 | | 3600 | 3601 | 3608 | ... | 4313 | 91.02 |
| | 65896 | 65897 | 65898 | ... | 66075 | rows | | 65896 | 65897 | 65898 | ... | 66075 | rows |
| | 6480 | 6484 | 6488 | ... | 7196 | | | 6480 | 6481 | 6488 | ... | 7193 | |
| | ... | ... | ... | ... | ... | | | ... | ... | ... | ... | ... | |
| | 81916 | 81917 | 81918 | ... | — | | | 81916 | 81917 | 81918 | ... | — | |
| | 179280 | 179284 | 179288 | ... | — | v | | 179280 | 179281 | 179288 | ... | — | v |
| #6 | 81920 | 81921 | 81922 | ... | 82099 | | #6 | 81920 | 81921 | 81922 | ... | 82099 | |
| | 721 | 725 | 729 | ... | 1437 | | | 722 | 723 | 730 | ... | 1435 | |
| | 82100 | 82101 | 82102 | ... | 82279 | | | 82100 | 82101 | 82102 | ... | 82279 | |
| | 3601 | 3605 | 3609 | ... | 4317 | 91.02 | | 3602 | 3603 | 3010 | ... | 4315 | 91.02 |
| | 82280 | 82281 | 82282 | ... | 82459 | rows | | 82280 | 82281 | 82282 | ... | 82459 | rows |
| | 6481 | 6485 | 6489 | ... | 7197 | | | 6482 | 6483 | 8490 | ... | 7195 | |
| | ... | ... | ... | ... | ... | | | ... | ... | ... | ... | ... | |
| | 98300 | 98301 | 98302 | ... | — | | | 98300 | 98301 | 98302 | ... | — | |
| | 179281 | 179285 | 179289 | ... | — | v | | 179282 | 179283 | 179290 | ... | — | v |
| #7 | 98304 | 98305 | 98306 | ... | 94483 | | #7 | 98304 | 98305 | 98306 | ... | 94483 | |
| | 722 | 726 | 730 | ... | 1438 | | | 724 | 725 | 732 | ... | 1437 | |
| | 98484 | 98485 | 98486 | ... | 98663 | | | 98484 | 98485 | 98486 | ... | 98663 | |
| | 3602 | 3606 | 3610 | ... | 4318 | 91.02 | | 3604 | 3605 | 3612 | ... | 4317 | 91.02 |
| | 98664 | 98665 | 98666 | ... | 98843 | rows | | 98664 | 98665 | 98666 | ... | 98843 | rows |
| | 6482 | 6486 | 6490 | ... | 7198 | | | 6484 | 6485 | 6492 | ... | 7197 | |
| | ... | ... | ... | ... | ... | | | ... | ... | ... | ... | ... | |
| | 114684 | 114685 | 114686 | ... | — | | | 114684 | 114685 | 114686 | ... | — | |
| | 179282 | 179286 | 179290 | ... | — | v | | 179284 | 179285 | 179292 | ... | — | v |
| #8 | 114688 | 114689 | 114690 | ... | 114867 | | #8 | 114688 | 114689 | 114690 | ... | 114867 | |
| | 723 | 727 | 731 | ... | 1439 | | | 726 | 727 | 734 | ... | 1439 | |
| | 114868 | 114869 | 114870 | ... | 115047 | | | 114868 | 114869 | 114870 | ... | 115047 | |
| | 3603 | 3607 | 3611 | ... | 4319 | 91.02 | | 3606 | 3607 | 3614 | ... | 4319 | 91.02 |
| | 115048 | 115049 | 115050 | ... | 115227 | rows | | 115048 | 115049 | 115050 | ... | 115227 | rows |
| | 6483 | 6487 | 6491 | ... | 7199 | | | 6486 | 6487 | 6494 | ... | 7199 | |
| | ... | ... | ... | ... | ... | | | ... | ... | ... | ... | ... | |
| | 131068 | 131069 | 131070 | ... | — | | | 131068 | 131069 | 131070 | ... | — | |
| | 179283 | 179287 | 179291 | ... | — | v | | 179286 | 179287 | 179294 | ... | — | v |
| #9 | 131072 | 131073 | 131074 | ... | 131251 | | #9 | 131072 | 131073 | 131074 | ... | 131251 | |
| | 1440 | 1444 | 1448 | ... | 2016 | | | 1440 | 1441 | 1448 | ... | 2153 | |
| | 131252 | 131252 | 131253 | ... | 131431 | | | 131252 | 131252 | 131253 | ... | 131431 | |
| | 4320 | 4324 | 4328 | ... | 5036 | 91.02 | | 4320 | 4321 | 4328 | ... | 5033 | 91.02 |
| | 131432 | 131433 | 131434 | ... | 131611 | rows | | 131432 | 131433 | 131434 | ... | 131611 | rows |
| | 7200 | 7204 | 7208 | ... | 7916 | | | 7200 | 7201 | 7208 | ... | 7913 | |
| | ... | ... | ... | ... | ... | | | ... | ... | ... | ... | ... | |
| | 147452 | 147453 | 147454 | ... | — | | | 147452 | 147453 | 147454 | ... | — | |
| | 180000 | 180004 | 180008 | ... | — | v | | 180000 | 180001 | 180008 | ... | — | v |
| #10 | 147456 | 147457 | 147458 | ... | 147635 | | #10 | 147456 | 147457 | 147458 | ... | 147635 | |
| | 1441 | 1445 | 1449 | ... | 2157 | | | 1442 | 1443 | 1450 | ... | 2155 | |
| | 147636 | 147637 | 147638 | ... | 147815 | | | 147636 | 147637 | 147638 | ... | 147815 | |
| | 4321 | 4325 | 4329 | ... | 5037 | 91.02 | | 4322 | 4323 | 4330 | ... | 5035 | 91.02 |

TABLE 1-continued

| | Y Channel < 180 columns > | | | | | | C Channel < 180 columns > | | | | |
|---|---|---|---|---|---|---|---|---|---|---|---|
| | 147816 | 147817 | 147818 | ... | 147995 | rows | 147816 | 147817 | 147818 | ... | 147995 | rows |
| | 7201 | 7205 | 7209 | ... | 7917 | | 7202 | 7203 | 7210 | ... | 7915 | |
| | ... | ... | ... | ... | ... | | ... | ... | ... | ... | ... | |
| | ... | ... | ... | ... | ... | | ... | ... | ... | ... | ... | |
| | 163836 | 163837 | 153838 | ... | — | | 163835 | 163837 | 163838 | ... | — | |
| | 180001 | 180005 | 180009 | ... | — | v | 180002 | 180003 | 180010 | ... | 180715 | v |
| #11 | 163840 | 163841 | 163842 | ... | 164019 | | #11 163840 | 163841 | 163842 | ... | 164019 | |
| | 1442 | 14467 | 1450 | ... | 2158 | | 1444 | 1445 | 1452 | ... | 2157 | |
| | 164020 | 164021 | 164022 | ... | 164199 | | 164020 | 164021 | 164022 | ... | 164199 | |
| | 4322 | 4326 | 4330 | ... | 5038 | 91.02 | 4324 | 4325 | 4332 | ... | 5037 | 91.02 |
| | 164200 | 164201 | 164202 | ... | 164379 | rows | 164200 | 164201 | 164202 | ... | 164379 | rows |
| | 7202 | 7206 | 7210 | ... | 7918 | | 7204 | 7205 | 7212 | ... | 7917 | |
| | ... | ... | ... | ... | ... | | ... | ... | ... | ... | ... | |
| | 180220 | 180221 | 180222 | ... | — | | 180220 | 180221 | 180222 | ... | — | |
| | 180002 | 180006 | 180010 | ... | — | v | 180004 | 180005 | 180012 | ... | — | v |
| #12 | 180224 | 180225 | 180226 | ... | 180403 | | #12 180224 | 180225 | 180226 | ... | 180403 | |
| | 1443 | 1447 | 1451 | ... | 2159 | | 1446 | 1447 | 1454 | ... | 2159 | |
| | 180404 | 180405 | 180406 | ... | 180583 | | 180404 | 180405 | 180406 | ... | 180583 | |
| | 4323 | 4327 | 4331 | ... | 5039 | 91.02 | 4326 | 4327 | 4334 | ... | 5039 | 91.02 |
| | 180584 | 180585 | 180586 | ... | 180763 | rows | 180584 | 180585 | 180586 | ... | 180763 | rows |
| | 7203 | 7207 | 7211 | ... | 7919 | | 7206 | 7207 | 7214 | ... | 7919 | |
| | ... | ... | ... | ... | ... | | ... | ... | ... | ... | ... | |
| | 196604 | 196605 | 196606 | ... | — | | 196604 | 196605 | 196606 | ... | — | |
| | 180003 | 180007 | 180011 | ... | — | v | 180006 | 180007 | 180014 | ... | — | v |
| #13 | 196608 | 196609 | 196610 | ... | 196787 | | #13 196608 | 196609 | 196610 | ... | 196787 | |
| | 2160 | 2164 | 2168 | ... | 2876 | | 2160 | 2161 | 2168 | ... | 2873 | |
| | 196788 | 196789 | 196790 | ... | 196967 | | 196788 | 196789 | 196790 | ... | 196967 | |
| | 5040 | 5044 | 5048 | ... | 5756 | 91.02 | 5040 | 5041 | 5048 | ... | 5753 | 91.02 |
| | 196968 | 196969 | 196970 | ... | 197147 | rows | 196968 | 196969 | 196970 | ... | 197147 | rows |
| | 7920 | 7924 | 7928 | ... | 8636 | | 7920 | 7921 | 7928 | ... | 8633 | |
| | ... | ... | ... | ... | ... | | ... | ... | ... | ... | ... | |
| | 212988 | 212989 | 212990 | ... | — | | 212988 | 212989 | 212990 | ... | — | |
| | 180720 | 180724 | 180728 | ... | — | v | 180720 | 180721 | 180728 | ... | — | v |
| #14 | 212992 | 212993 | 212994 | ... | 213171 | | #14 212992 | 212993 | 212994 | ... | 213171 | |
| | 2161 | 2165 | 2169 | ... | 2877 | | 2162 | 2163 | 2170 | ... | 2875 | |
| | 213172 | 213173 | 213174 | ... | 213351 | | 213172 | 213173 | 213174 | ... | 213351 | |
| | 5041 | 5045 | 5049 | ... | 5757 | 91.02 | 5042 | 5043 | 505 | ... | 5755 | 91.02 |
| | 213352 | 213353 | 213354 | ... | 213531 | rows | 213352 | 213353 | 213354 | ... | 213531 | rows |
| | 7971 | 7925 | 7929 | ... | 8637 | | 7922 | 7923 | 7930 | ... | 8635 | |
| | ... | ... | ... | ... | ... | | ... | ... | ... | ... | ... | |
| | 229372 | 229373 | 229374 | ... | — | | 229372 | 229373 | 229374 | ... | — | |
| | 180721 | 180725 | 180729 | ... | — | v | 180722 | 180723 | 180730 | ... | — | v |
| #15 | 229376 | 229377 | 229378 | ... | 229555 | | #15 229376 | 229377 | 229378 | ... | 229555 | |
| | 2162 | 2166 | 2170 | ... | 2878 | | 2164 | 2165 | 2172 | ... | 2877 | |
| | 229556 | 229557 | 229558 | ... | 229735 | | 229556 | 229557 | 229558 | ... | 229735 | |
| | 5042 | 5057 | 5050 | ... | 5758 | 91.02 | 5044 | 5045 | 5052 | ... | 5757 | 91.02 |
| | 229736 | 229737 | 229738 | ... | 229915 | rows | 229736 | 229737 | 229738 | ... | 229915 | rows |
| | 7922 | 7926 | 7930 | ... | 8638 | | 7924 | 7925 | 7932 | ... | 8637 | |
| | ... | ... | ... | ... | ... | | ... | ... | ... | ... | ... | |
| | 245756 | 245757 | 245758 | ... | — | | 245756 | 245757 | 245758 | ... | — | |
| | 180722 | 180726 | 180730 | ... | — | v | 180724 | 180725 | 180732 | ... | — | v |
| #16 | 245760 | 245761 | 245762 | ... | 245939 | | #16 245760 | 245761 | 245762 | ... | 245939 | |
| | 2163 | 2167 | 2171 | ... | 2879 | | 2166 | 2167 | 2174 | ... | 2879 | |
| | 245940 | 245941 | 245942 | ... | 246119 | | 245940 | 245941 | 245942 | ... | 246119 | |
| | 5043 | 5047 | 5051 | ... | 5759 | 91.02 | 5046 | 5047 | 5054 | ... | 5759 | 91.02 |
| | 246120 | 246121 | 246122 | ... | 246299 | rows | 246120 | 246121 | 246122 | ... | 246299 | rows |
| | 7923 | 7927 | 7931 | ... | 8639 | | 7926 | 7927 | 7934 | ... | 8639 | |
| | ... | ... | ... | ... | ... | | ... | ... | ... | ... | ... | |
| | 262140 | 262141 | 252142 | ... | — | | 262140 | 262141 | 262142 | ... | — | |
| | 180723 | 180727 | 180731 | ... | — | v | 180726 | 180727 | 180734 | ... | — | v |

TABLE 2

| Y & C Channels Poly-Image Reconstruction | | | | | | | | | | | |
|---|---|---|---|---|---|---|---|---|---|---|---|
| | NTSC < 180 columns > | | | | | | PAL < 180 columns > | | | | |
| #1 | 0 | 1 | 2 | ... | 179 | #1 | 0 | 1 | 2 | ... | 179 |
| | 0 | 1 | 2 | ... | 179 | | 0 | 1 | 2 | ... | 179 |
| | 180 | 181 | 182 | ... | 359 | | 180 | 181 | 182 | ... | 359 |
| | 720 | 721 | 722 | ... | 800 | 61 | 720 | 721 | 722 | ... | 800 | 74 |
| | 360 | 361 | 362 | ... | 539 | rows | 360 | 361 | 362 | ... | 539 | rows |
| | 1440 | 1441 | 1442 | ... | 1619 | | 1440 | 1441 | 1442 | ... | 1619 |
| | ... | ... | ... | ... | ... | | ... | ... | ... | ... | ... |
| | 10800 | 10801 | 10802 | ... | 10979 | | 10800 | 10801 | 10802 | ... | 10979 |
| | 43200 | 43201 | 43202 | ... | 43379 | v | 52560 | 52561 | 52562 | ... | 52739 | v |
| #2 | 16384 | 16385 | 16386 | ... | 16563 | #2 | 16384 | 16385 | 16386 | ... | 16563 |
| | 180 | 181 | 182 | ... | 359 | | 180 | 181 | 182 | ... | 359 |
| | 16564 | 16565 | 16566 | ... | 16743 | | 16564 | 16565 | 16566 | ... | 16743 |

TABLE 2-continued

Y & C Channels Poly-Image Reconstruction

| | NTSC < 180 columns > | | | | | | PAL < 180 columns > | | | | |
|---|---|---|---|---|---|---|---|---|---|---|---|
| | 900 | 901 | 902 | ... | 1079 | 61 | | 900 | 901 | 902 | ... | 1079 | 74 |
| | 16744 | 16745 | 16746 | ... | 16923 | rows | | 16744 | 16745 | 16746 | ... | 16923 | rows |
| | 1620 | 1621 | 1622 | ... | 1799 | | | 1620 | 1621 | 1622 | ... | 1799 | |
| | ... | ... | ... | ... | ... | | | ... | ... | ... | ... | ... | |
| | 27184 | 27185 | 27186 | ... | 27363 | | | 27184 | 27185 | 27186 | ... | 27363 | |
| | 43380 | 43381 | 43382 | ... | 43559 | v | | 52740 | 52741 | 52742 | ... | 52919 | v |
| #3 | 32768 | 32769 | 32770 | ... | 32947 | | #3 | 32768 | 32769 | 32770 | ... | 32947 | |
| | 3360 | 361 | 362 | ... | 539 | | | 3360 | 361 | 362 | ... | 539 | |
| | 32948 | 32949 | 32950 | ... | 33127 | | | 32948 | 32949 | 32950 | ... | 33127 | |
| | 1080 | 1081 | 1082 | ... | 1259 | 61 | | 1080 | 1081 | 1082 | ... | 1259 | 74 |
| | 33128 | 33129 | 33130 | ... | 33307 | rows | | 33128 | 33129 | 33130 | ... | 33307 | rows |
| | 1800 | 1801 | 1802 | ... | 1979 | | | 1800 | 1801 | 1802 | ... | 1979 | |
| | ... | ... | ... | ... | ... | | | ... | ... | ... | ... | ... | |
| | 43568 | 43569 | 43570 | ... | 43747 | | | 43568 | 43569 | 43570 | ... | 43747 | |
| | 43560 | 43561 | 43562 | ... | 43739 | v | | 52920 | 52921 | 52922 | ... | 53099 | v |
| #4 | 49152 | 49153 | 49154 | ... | 43991 | | #4 | 49152 | 49153 | 49154 | ... | 43991 | |
| | 540 | 541 | 542 | ... | 719 | | | 540 | 541 | 542 | ... | 719 | |
| | 49332 | 49333 | 49334 | ... | 49511 | | | 49332 | 49333 | 49334 | ... | 49511 | |
| | 1260 | 1261 | 1262 | ... | 1439 | 61 | | 1260 | 1261 | 1262 | ... | 1439 | 74 |
| | 49512 | 49513 | 49514 | ... | 49691 | rows | | 49512 | 49513 | 49514 | ... | 49691 | rows |
| | 1980 | 1981 | 1982 | ... | 2159 | | | 1980 | 1981 | 1982 | ... | 2159 | |
| | ... | ... | ... | ... | ... | | | ... | ... | ... | ... | ... | |
| | 59952 | 59953 | 59954 | ... | 60131 | | | 59952 | 59953 | 59954 | ... | 60131 | |
| | 43740 | 43741 | 43742 | ... | 43919 | v | | 53100 | 53101 | 53102 | ... | 53279 | v |
| #5 | 65536 | 65537 | 65538 | ... | 65715 | | #5 | 65536 | 65537 | 65538 | ... | 65715 | |
| | 43920 | 43921 | 43922 | ... | 44099 | | | 43920 | 43921 | 43922 | ... | 44099 | |
| | 65716 | 65717 | 65718 | ... | 65895 | | | 65716 | 65717 | 65718 | ... | 65895 | |
| | 44640 | 44641 | 44642 | ... | 44819 | 61 | | 44640 | 44641 | 44642 | ... | 44819 | 74 |
| | 65896 | 65897 | 65898 | ... | 66075 | rows | | 65896 | 65897 | 65898 | ... | 66075 | rows |
| | 45360 | 45361 | 45362 | ... | 45539 | | | 45360 | 45361 | 45362 | ... | 45539 | |
| | ... | ... | ... | ... | ... | | | ... | ... | ... | ... | ... | |
| | 76336 | 76337 | 76338 | ... | 76515 | | | 76336 | 76337 | 76338 | ... | 76515 | |
| | 87120 | 87121 | 87122 | ... | 87299 | v | | 96480 | 96481 | 96482 | ... | 96659 | v |
| #6 | 81920 | 81921 | 81922 | ... | 82099 | | #6 | 81920 | 81921 | 81922 | ... | 82099 | |
| | 44100 | 44101 | 44102 | ... | 44279 | | | 44100 | 44101 | 44102 | ... | 44279 | |
| | 82100 | 82101 | 82102 | ... | 82279 | | | 82100 | 82101 | 82102 | ... | 82279 | |
| | 44820 | 44821 | 44822 | ... | 44999 | 61 | | 44820 | 44821 | 44822 | ... | 44999 | 74 |
| | 82280 | 82281 | 82282 | ... | 82459 | rows | | 82280 | 82281 | 82282 | ... | 82459 | rows |
| | 45540 | 45541 | 45542 | ... | 45719 | | | 45540 | 45541 | 45542 | ... | 45719 | |
| | ... | ... | ... | ... | ... | | | ... | ... | ... | ... | ... | |
| | 92720 | 92721 | 92722 | ... | 92899 | | | 92720 | 92721 | 92722 | ... | 92899 | |
| | 87300 | 87301 | 87302 | ... | 87479 | v | | 96660 | 96661 | 96662 | ... | 96839 | v |
| #7 | 98304 | 98305 | 98306 | ... | 94483 | | #7 | 98304 | 98305 | 98306 | ... | 94483 | |
| | 44280 | 44281 | 44282 | ... | 44459 | | | 44280 | 44281 | 44282 | ... | 44459 | |
| | 98484 | 98485 | 98486 | ... | 98663 | | | 98484 | 98485 | 98486 | ... | 98663 | |
| | 45000 | 45001 | 45002 | ... | 45179 | 61 | | 45000 | 45001 | 45002 | ... | 45179 | 74 |
| | 98664 | 98665 | 98666 | ... | 98843 | rows | | 98664 | 98665 | 98666 | ... | 98843 | rows |
| | 45720 | 45721 | 45722 | ... | 45899 | | | 45720 | 45721 | 45722 | ... | 45899 | |
| | ... | ... | ... | ... | ... | | | ... | ... | ... | ... | ... | |
| | 109104 | 109105 | 109106 | ... | 109283 | | | 109104 | 109105 | 109106 | ... | 109283 | |
| | 87480 | 87481 | 87482 | ... | 87659 | v | | 96840 | 96841 | 96842 | ... | 97019 | v |
| #8 | 114688 | 114689 | 114690 | ... | 114867 | | #8 | 114688 | 114689 | 114690 | ... | 114867 | |
| | 44460 | 44461 | 44462 | ... | 44639 | | | 44460 | 44461 | 44462 | ... | 44639 | |
| | 114868 | 114869 | 114870 | ... | 115047 | | | 114868 | 114869 | 114870 | ... | 115047 | |
| | 45180 | 45181 | 45182 | ... | 45359 | 61 | | 45180 | 45181 | 45182 | ... | 45359 | 74 |
| | 115048 | 115049 | 115050 | ... | 115227 | rows | | 115048 | 115049 | 115050 | ... | 115227 | rows |
| | 45900 | 45901 | 45902 | ... | 46079 | | | 45900 | 45901 | 45902 | ... | 46079 | |
| | ... | ... | ... | ... | ... | | | ... | ... | ... | ... | ... | |
| | 125488 | 125489 | 125490 | ... | 125667 | | | 125488 | 125489 | 125490 | ... | 125667 | |
| | 87660 | 87661 | 87662 | ... | 87839 | v | | 97020 | 97021 | 97022 | ... | 97199 | v |
| #9 | 131072 | 131073 | 131074 | ... | 131251 | | #9 | 131072 | 131073 | 131074 | ... | 131251 | |
| | 87840 | 87841 | 87842 | ... | 88019 | | | 87840 | 87841 | 87842 | ... | 88019 | |
| | 131252 | 131252 | 131253 | ... | 131431 | | | 131252 | 131252 | 131253 | ... | 131431 | |
| | 88560 | 88561 | 88562 | ... | 88739 | 61 | | 88560 | 88561 | 88562 | ... | 88739 | 74 |
| | 131432 | 131433 | 131434 | ... | 131611 | rows | | 131432 | 131433 | 131434 | ... | 131611 | rows |
| | 89280 | 89281 | 89282 | ... | 89459 | | | 89280 | 89281 | 89282 | ... | 89459 | |
| | ... | ... | ... | ... | ... | | | ... | ... | ... | ... | ... | |
| | 141872 | 141873 | 141874 | ... | 142051 | | | 141872 | 141873 | 141874 | ... | 142051 | |
| | 131040 | 131041 | 131042 | ... | 131219 | v | | 140400 | 140401 | 140402 | ... | 140579 | v |
| #10 | 147456 | 147457 | 147458 | ... | 147635 | | #10 | 147456 | 147457 | 147458 | ... | 147635 | |
| | 88020 | 88021 | 88022 | ... | 88199 | | | 88020 | 88021 | 88022 | ... | 88199 | |
| | 147636 | 147637 | 147638 | ... | 147815 | | | 147636 | 147637 | 147638 | ... | 147815 | |
| | 88740 | 88741 | 88742 | ... | 88919 | 61 | | 88740 | 88741 | 88742 | ... | 88919 | 74 |
| | 147816 | 147817 | 147818 | ... | 147995 | rows | | 147816 | 147817 | 147818 | ... | 147995 | rows |
| | 89460 | 89461 | 89462 | ... | 89639 | | | 89460 | 89461 | 89462 | ... | 89639 | |
| | ... | ... | ... | ... | ... | | | ... | ... | ... | ... | ... | |
| | 158256 | 158257 | 158258 | ... | 158435 | | | 158256 | 158257 | 158258 | ... | 158435 | |
| | 131220 | 131221 | 131222 | ... | 131399 | v | | 140580 | 140581 | 140582 | ... | 140759 | v |
| #11 | 163840 | 163841 | 163842 | ... | 164019 | | #11 | 163840 | 163841 | 163842 | ... | 164019 | |

TABLE 2-continued

Y & C Channels Poly-Image Reconstruction

| | NTSC < 180 columns > | | | | | | PAL < 180 columns > | | | | |
|---|---|---|---|---|---|---|---|---|---|---|---|
| | 88200 | 88201 | 88202 | ... | 88379 | | 88200 | 88201 | 88202 | ... | 88379 |
| | 164020 | 164021 | 164022 | ... | 164199 | | 164020 | 164021 | 164022 | ... | 164199 |
| | 88920 | 88921 | 88922 | ... | 89099 | 61 | 88920 | 88921 | 88922 | ... | 89099 | 74 |
| | 164200 | 164201 | 164202 | ... | 164379 | rows | 164200 | 164201 | 164202 | ... | 164379 | rows |
| | 89640 | 89641 | 89642 | ... | 89819 | | 89640 | 89641 | 89642 | ... | 89819 |
| | ... | ... | ... | ... | ... | | ... | ... | ... | ... | ... |
| | 174640 | 174641 | 174642 | ... | 174819 | | 174640 | 174641 | 174642 | ... | 174819 |
| | 131400 | 131401 | 131402 | ... | 131579 | v | 140760 | 140761 | 140762 | ... | 140939 | v |
| #12 | 180224 | 180225 | 180226 | ... | 180403 | #12 | 180224 | 180225 | 180226 | ... | 180403 |
| | 88380 | 88381 | 88382 | ... | 88559 | | 88380 | 88381 | 88382 | ... | 88559 |
| | 180404 | 180405 | 180406 | ... | 180583 | | 180404 | 180405 | 180406 | ... | 180583 |
| | 89100 | 89101 | 89102 | ... | 89279 | 61 | 89100 | 89101 | 89102 | ... | 89279 | 74 |
| | 180584 | 180585 | 180586 | ... | 180763 | rows | 180584 | 180585 | 180586 | ... | 180763 | rows |
| | 89820 | 89821 | 89822 | ... | 89999 | | 89820 | 89821 | 89822 | ... | 89999 |
| | ... | ... | ... | ... | ... | | ... | ... | ... | ... | ... |
| | 191024 | 191025 | 191026 | ... | 191203 | | 191024 | 191025 | 191026 | ... | 191203 |
| | 131580 | 131581 | 131582 | ... | 131759 | v | 131580 | 131581 | 131582 | ... | 131759 | v |
| #13 | 196608 | 196609 | 196610 | ... | 196787 | #13 | 196608 | 196609 | 196610 | ... | 196787 |
| | 131760 | 131761 | 131762 | ... | 131939 | | 131760 | 131761 | 131762 | ... | 131939 |
| | 196788 | 196789 | 196790 | ... | 196967 | | 196788 | 196789 | 196790 | ... | 196967 |
| | 132480 | 132481 | 132482 | ... | 132659 | 61 | 132480 | 132481 | 132482 | ... | 132659 | 74 |
| | 196968 | 196969 | 196970 | ... | 197147 | rows | 196968 | 196969 | 196970 | ... | 197147 | rows |
| | 133200 | 133201 | 133202 | ... | 133379 | | 133200 | 133201 | 133202 | ... | 133379 |
| | ... | ... | ... | ... | ... | | ... | ... | ... | ... | ... |
| | 207408 | 207409 | 207410 | ... | 207587 | | 207408 | 207409 | 207410 | ... | 207587 |
| | 174960 | 174961 | 174962 | ... | 175139 | v | 184320 | 184321 | 184322 | ... | 184499 | v |
| #14 | 212992 | 212993 | 212994 | ... | 213171 | #14 | 212992 | 212993 | 212994 | ... | 213171 |
| | 131940 | 131941 | 131942 | ... | 132119 | | 131940 | 131941 | 131942 | ... | 132119 |
| | 213172 | 213173 | 213174 | ... | 213351 | | 213172 | 213173 | 213174 | ... | 213351 |
| | 132660 | 132661 | 132662 | ... | 132839 | 61 | 132660 | 132661 | 132662 | ... | 132839 | 74 |
| | 213352 | 213353 | 213354 | ... | 213531 | rows | 213352 | 213353 | 213354 | ... | 213531 | rows |
| | 133380 | 133381 | 133382 | ... | 133559 | | 133380 | 133381 | 133382 | ... | 133559 |
| | ... | ... | ... | ... | ... | | ... | ... | ... | ... | ... |
| | 223792 | 223793 | 223794 | ... | 223971 | | 223792 | 223793 | 223794 | ... | 223971 |
| | 175140 | 175141 | 175142 | ... | 175319 | v | 175140 | 175141 | 175142 | ... | 175319 | v |
| #15 | 229376 | 229377 | 229378 | ... | 229555 | #15 | 229376 | 229377 | 229378 | ... | 229555 |
| | 132120 | 132121 | 132122 | ... | 132299 | | 132120 | 132121 | 132122 | ... | 132299 |
| | 229556 | 229557 | 229558 | ... | 229735 | | 229556 | 229557 | 229558 | ... | 229735 |
| | 132840 | 132841 | 132842 | ... | 133019 | 61 | 132840 | 132841 | 132842 | ... | 133019 | 74 |
| | 229736 | 229737 | 229738 | ... | 229915 | rows | 229736 | 229737 | 229738 | ... | 229915 | rows |
| | 133560 | 133561 | 133562 | ... | 133739 | | 133560 | 133561 | 133562 | ... | 133739 |
| | ... | ... | ... | ... | ... | | ... | ... | ... | ... | ... |
| | 240176 | 240177 | 240178 | ... | 240355 | | 240176 | 240177 | 240178 | ... | 240355 |
| | 175320 | 175321 | 175322 | ... | 175499 | v | 184680 | 184681 | 184682 | ... | 184859 | v |
| #16 | 245760 | 245761 | 245762 | ... | 245939 | #16 | 245760 | 245761 | 245762 | ... | 245939 |
| | 132300 | 132301 | 132302 | ... | 132479 | | 132300 | 132301 | 132302 | ... | 132479 |
| | 245940 | 245941 | 245942 | ... | 246119 | | 245940 | 245941 | 245942 | ... | 246119 |
| | 133020 | 133021 | 133022 | ... | 133199 | 61 | 133020 | 133021 | 133022 | ... | 133199 | 74 |
| | 246120 | 246121 | 246122 | ... | 246299 | rows | 246120 | 246121 | 246122 | ... | 246299 | rows |
| | 133740 | 133741 | 133742 | ... | 133919 | | 133740 | 133741 | 133742 | ... | 133919 |
| | ... | ... | ... | ... | ... | | ... | ... | ... | ... | ... |
| | 256560 | 256561 | 256562 | ... | 256739 | | 256560 | 256561 | 256562 | ... | 256739 |
| | 175500 | 175501 | 175502 | ... | 175679 | v | 184860 | 184861 | 184862 | ... | 185039 | v |

Figure 4:
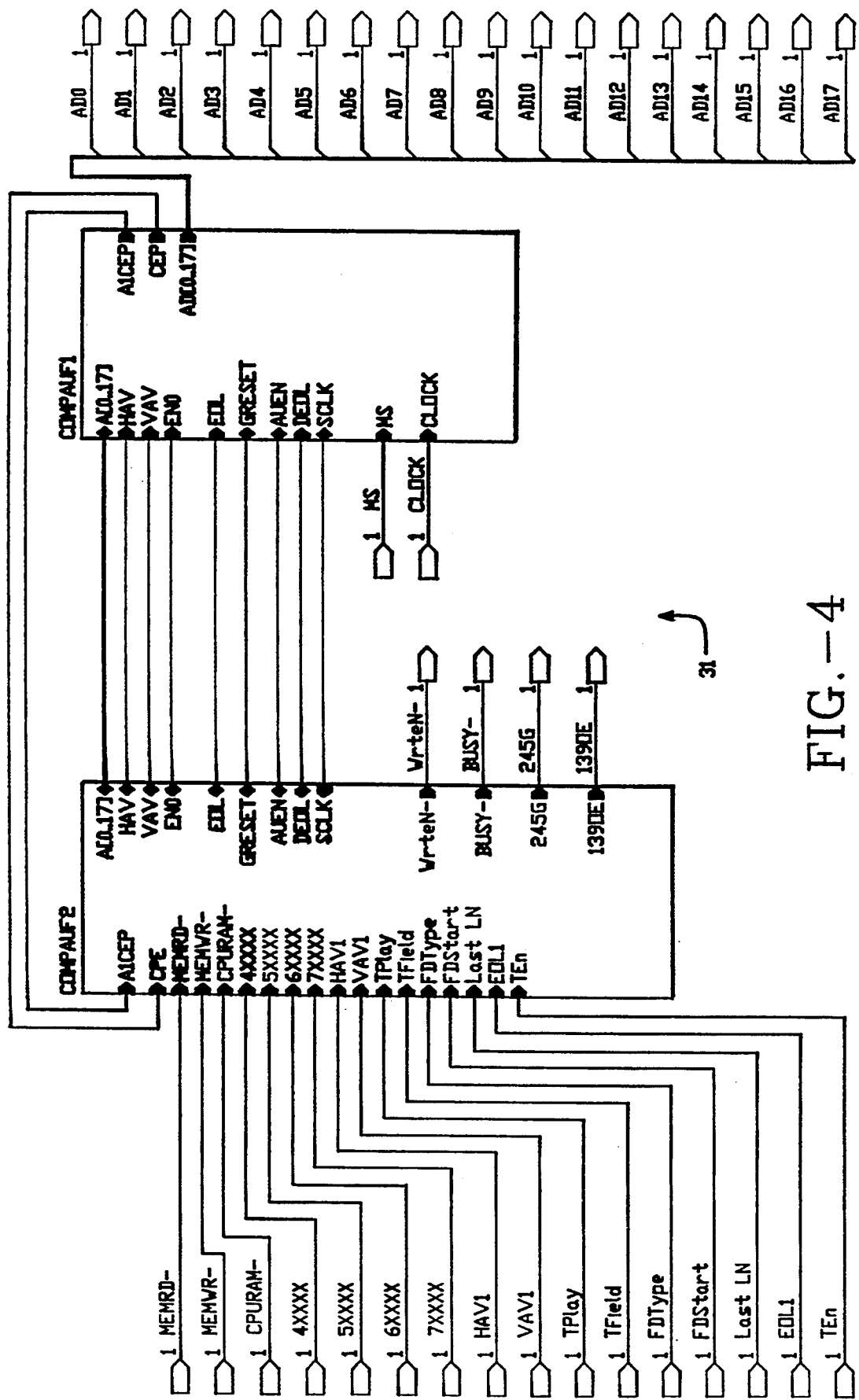
Figure 6A:
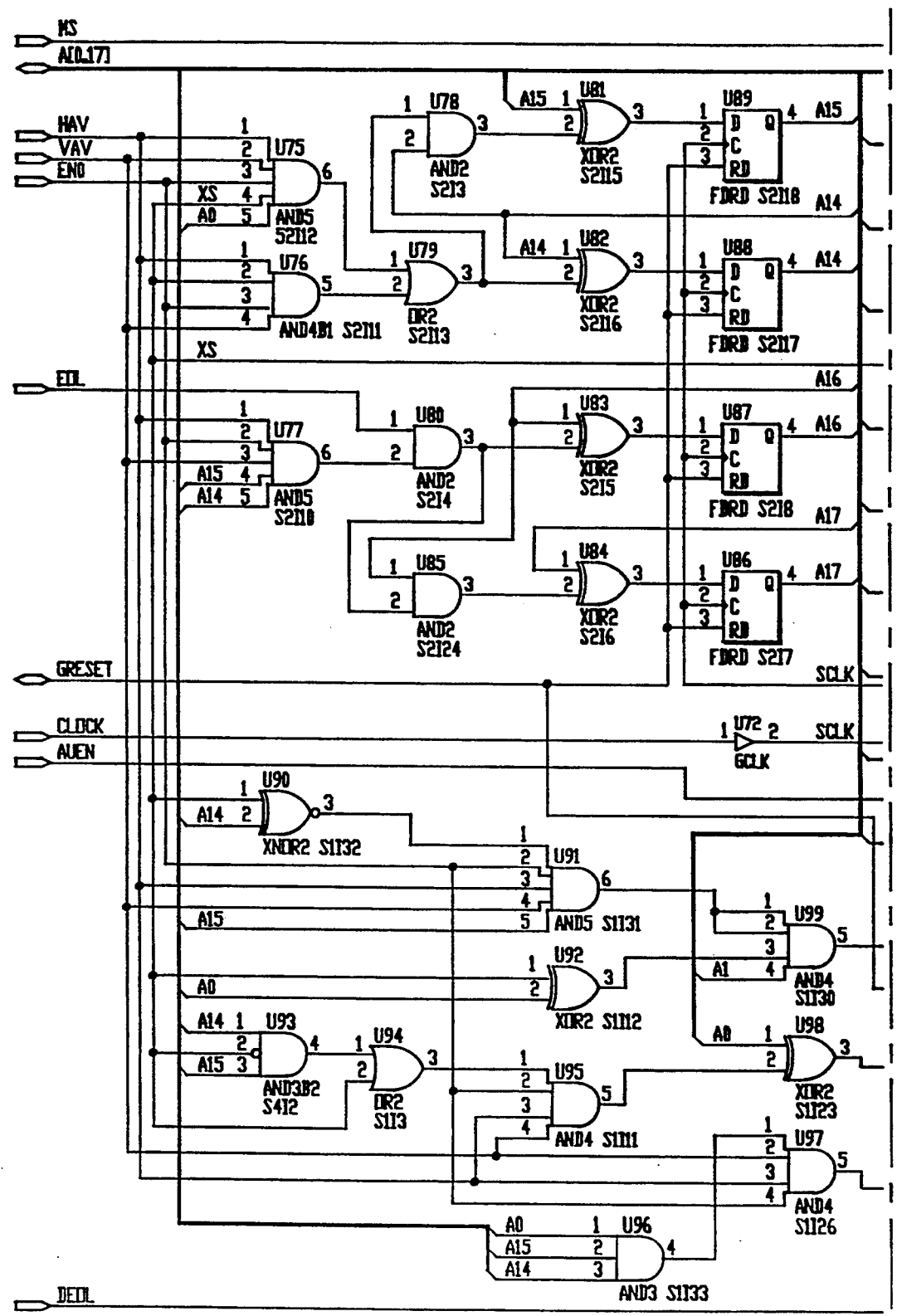
Figure 6B:
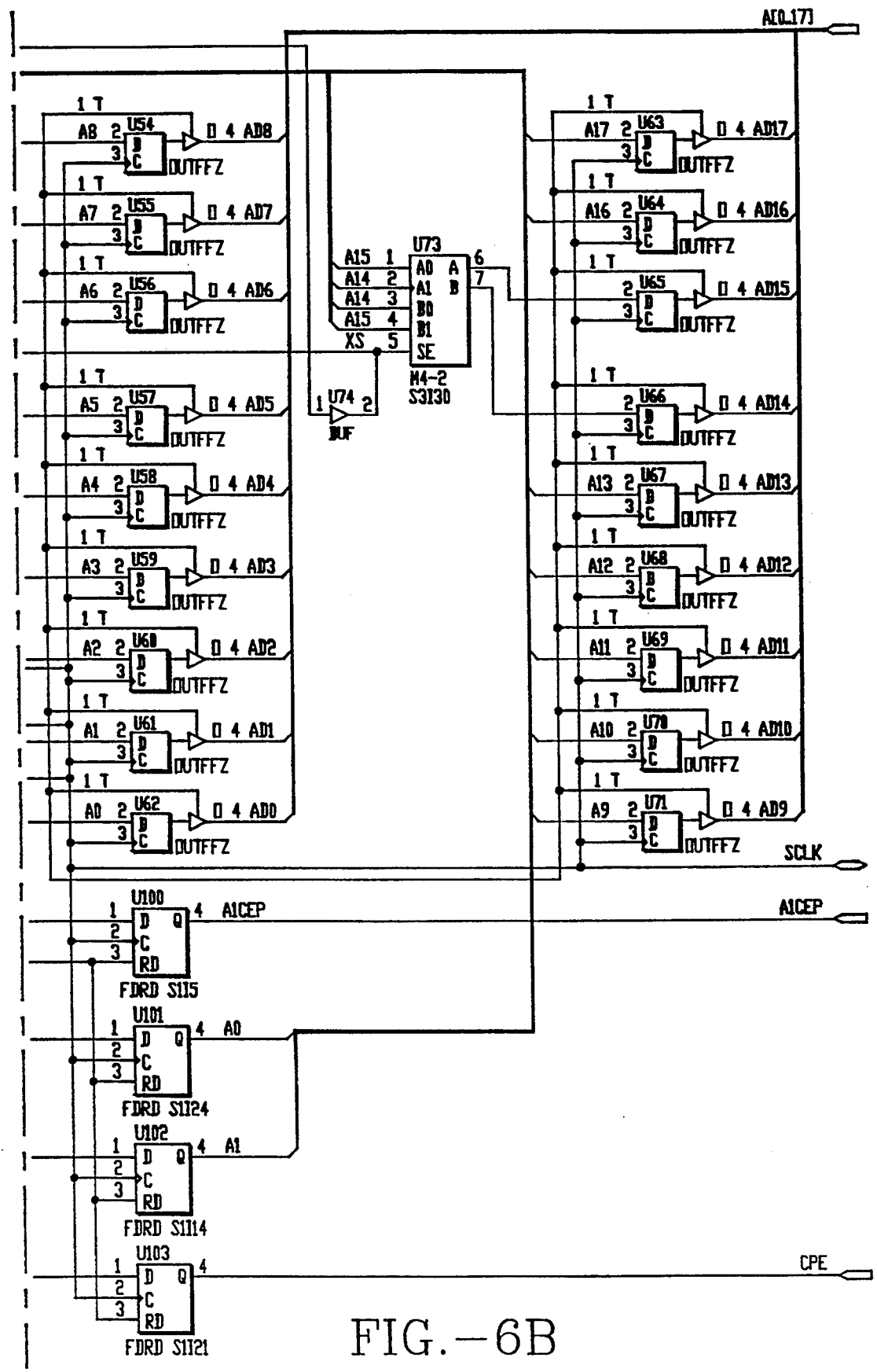
Figure 7:
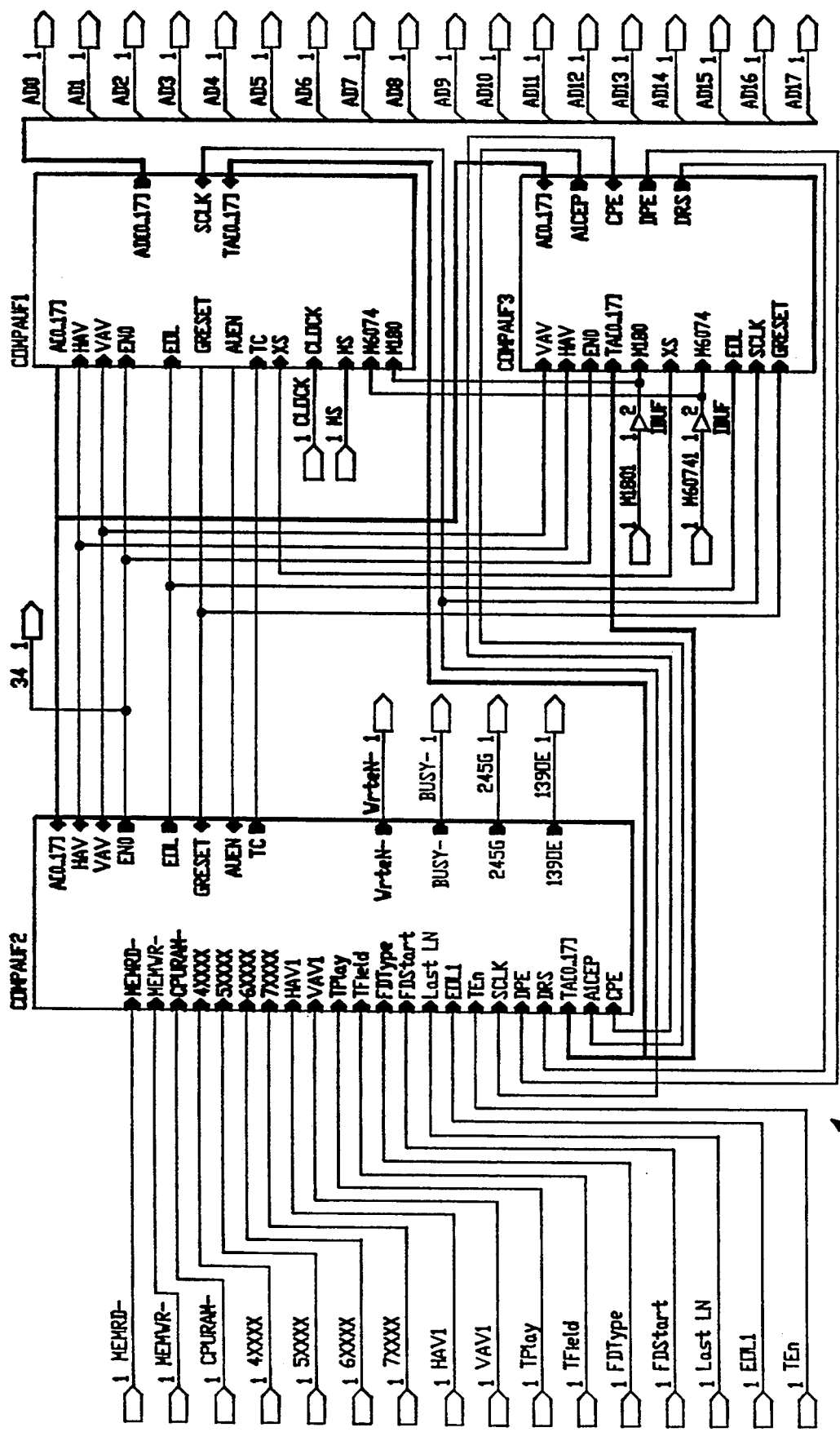
Figure 8A:
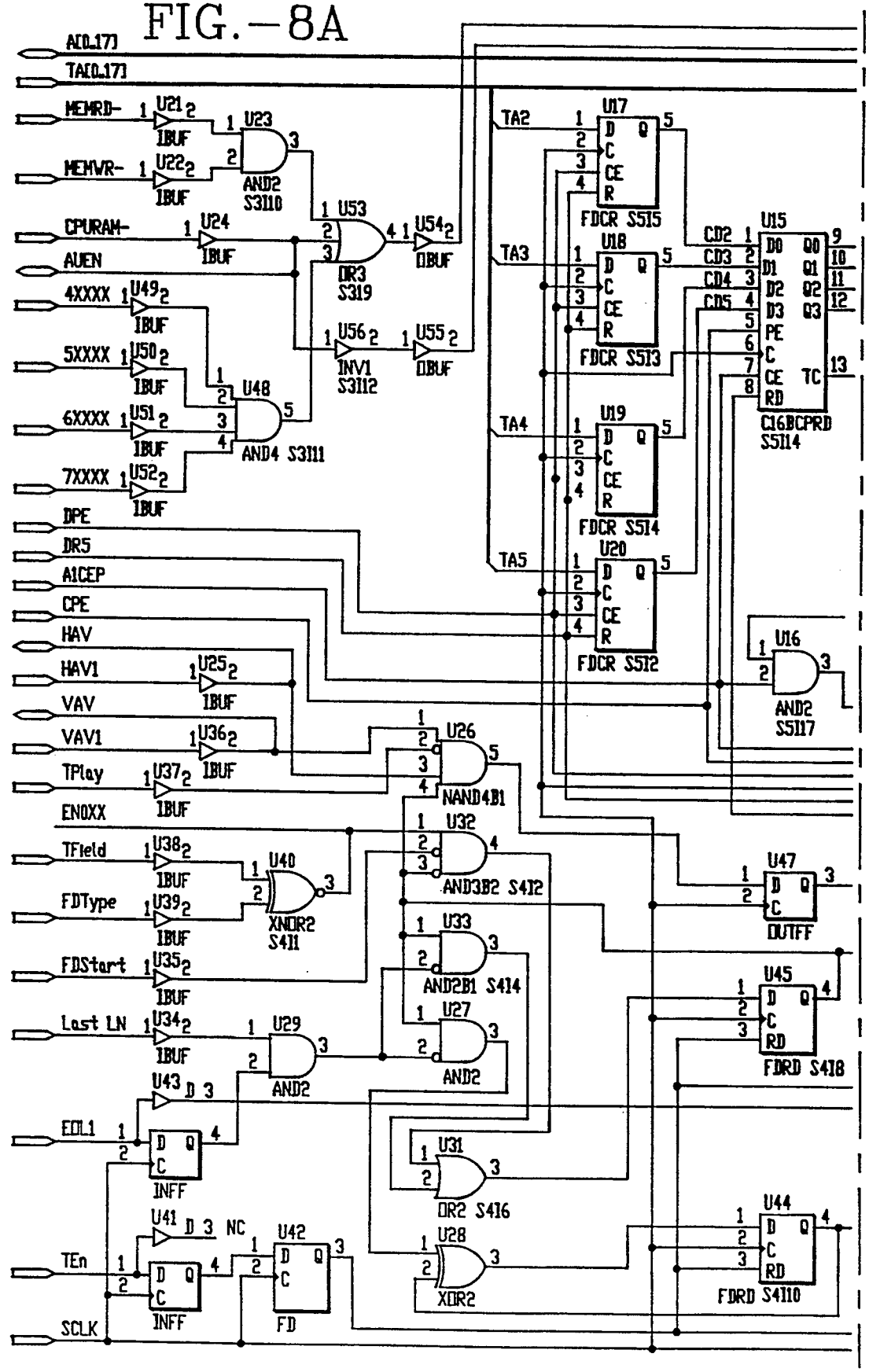
Figure 8B:
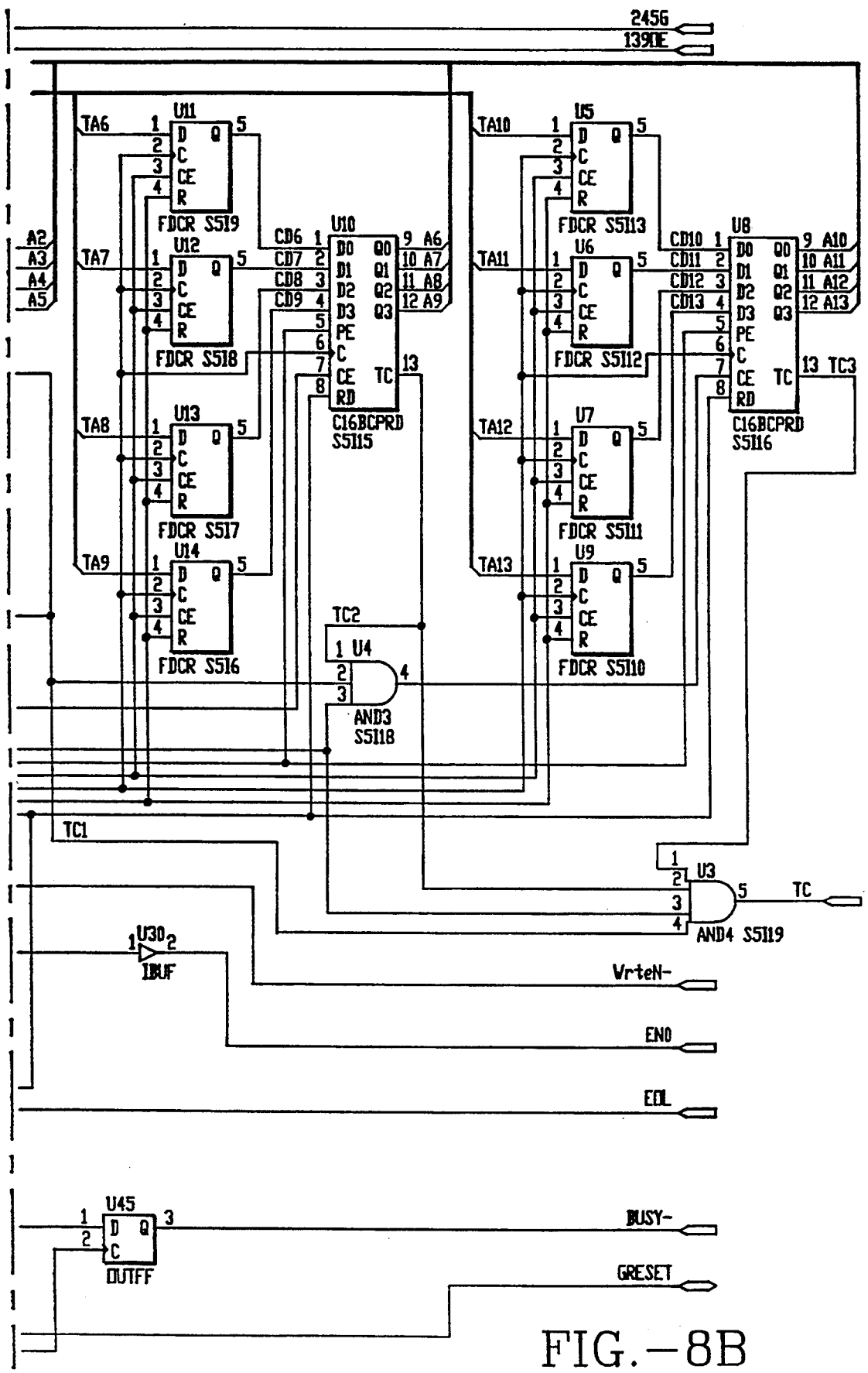
Figure 9A:
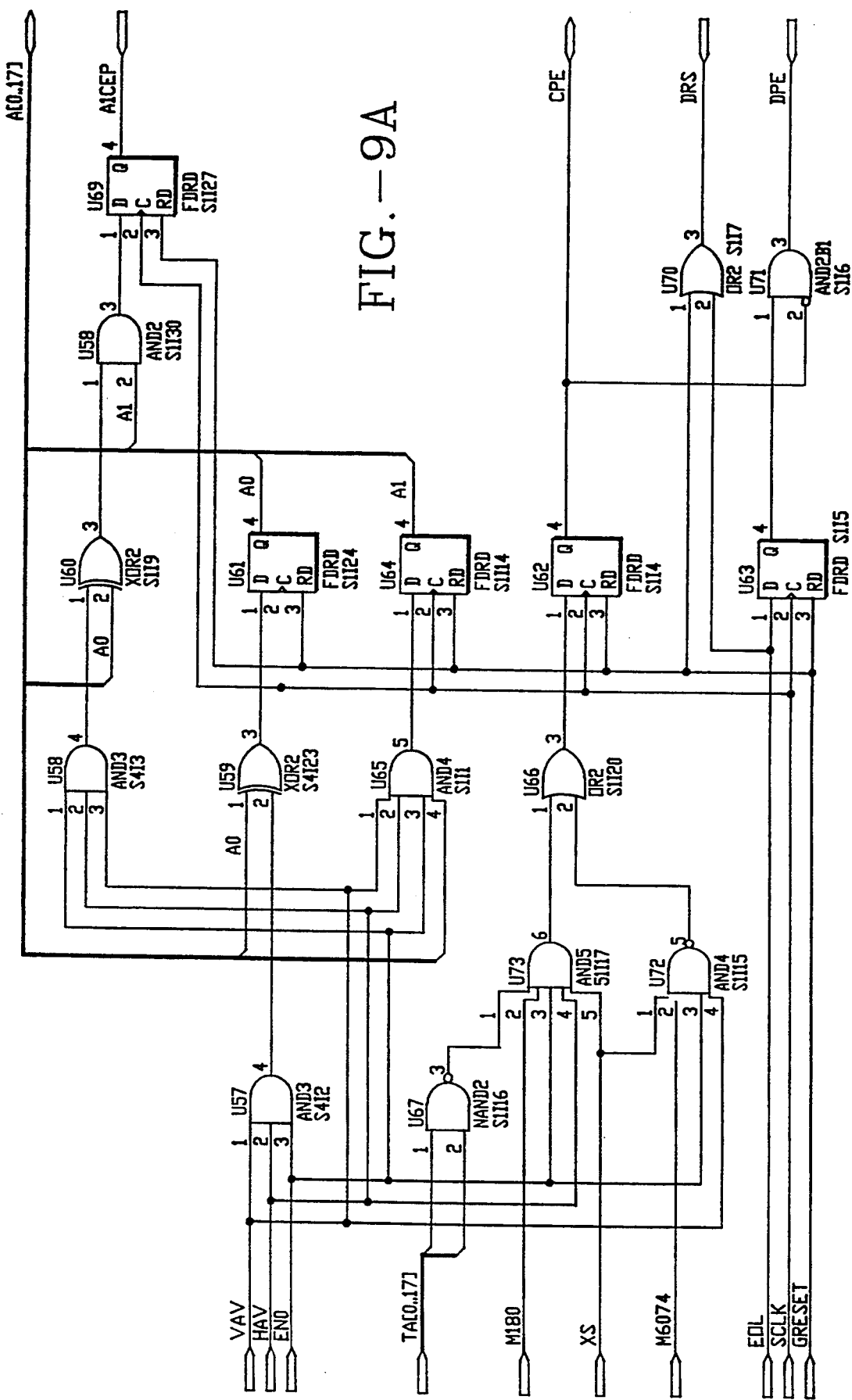
Figure 9B:
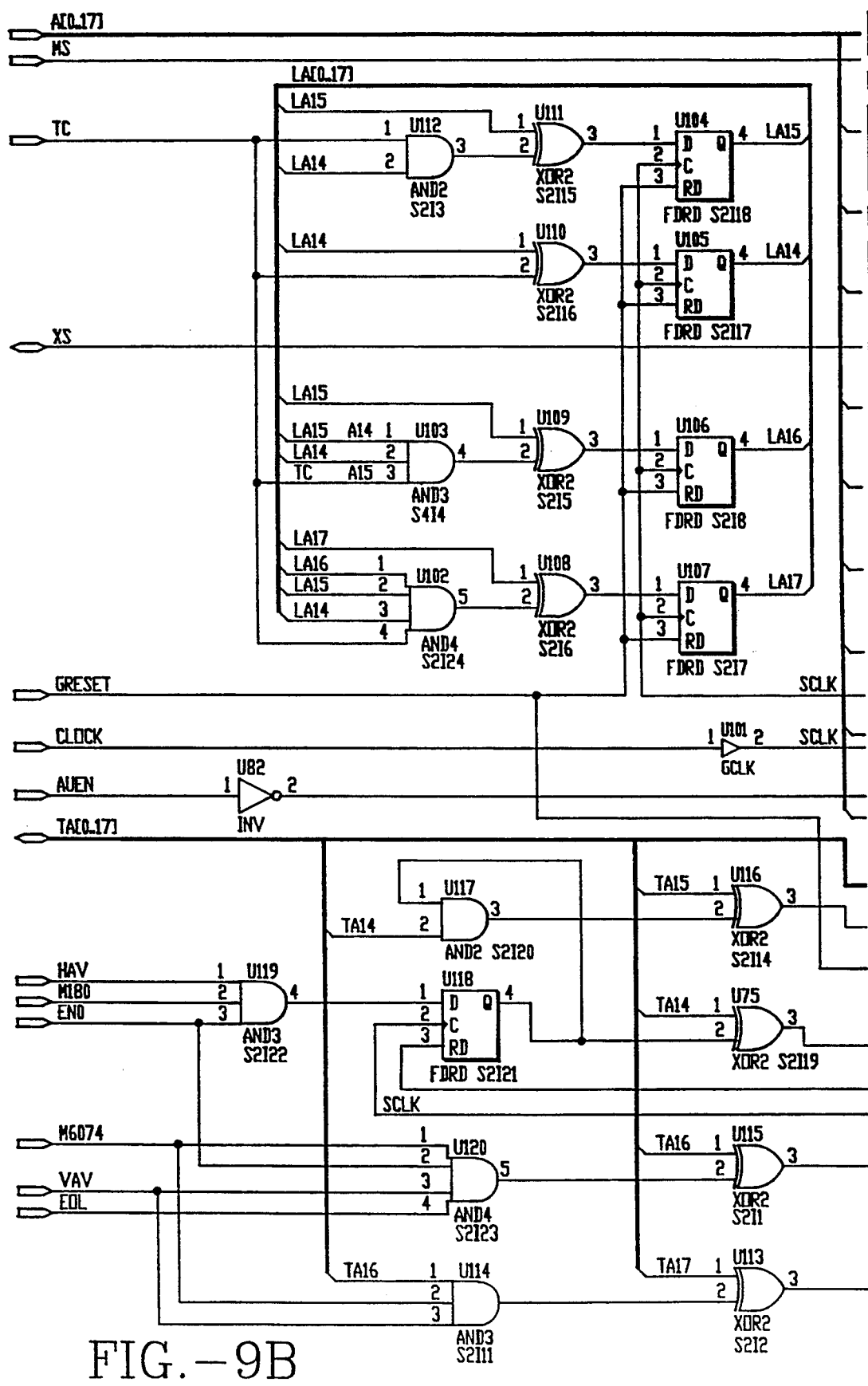
Figure 9C:
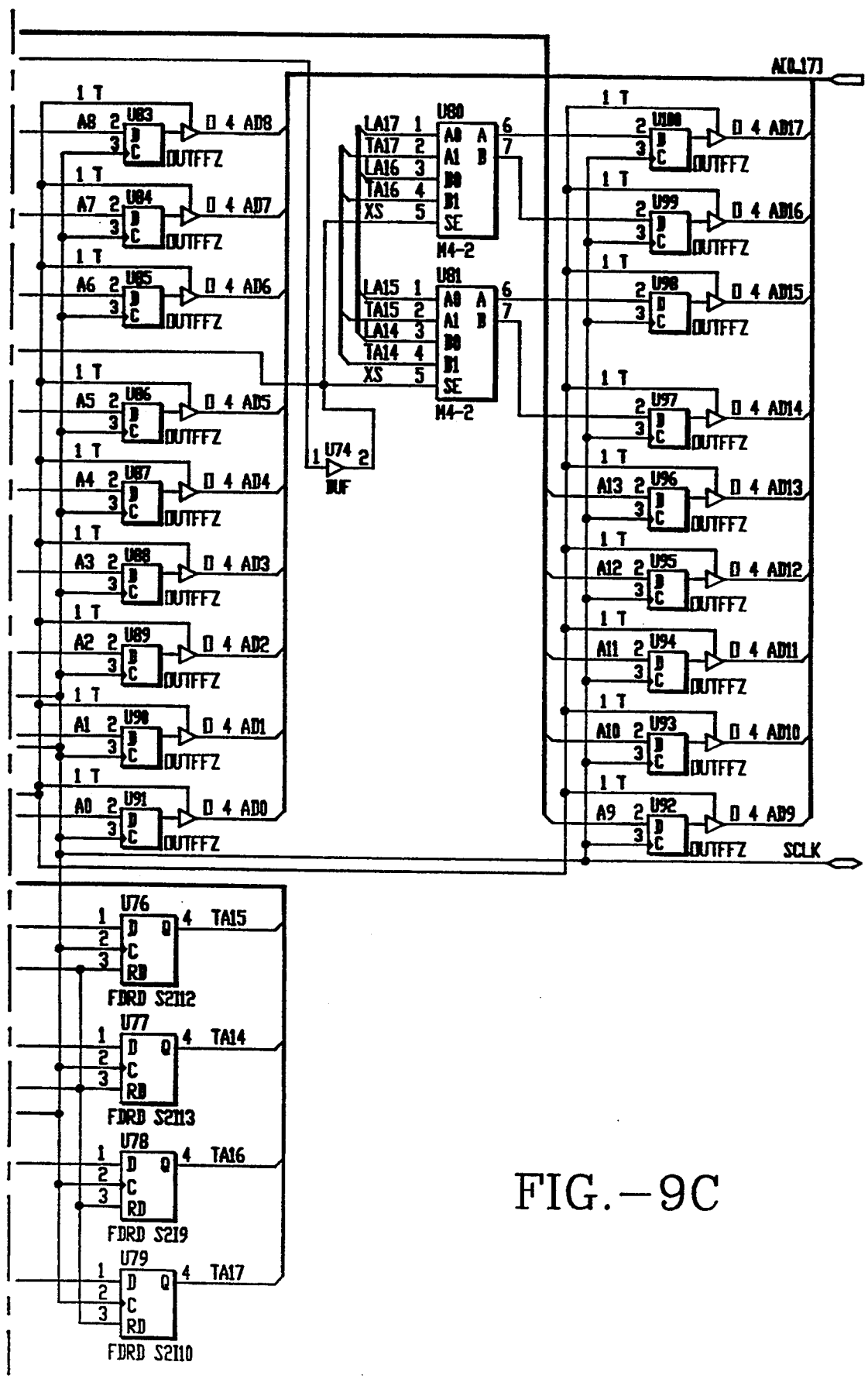

The address generation and modification for transfers between the buffer store 24 and the framestores is encapsulated in the field-programmable logic array (FPLA) integrated circuit 31. Circuit schematics which comprise the effective circuitry programmed into the integrated circuit 31 for each of the 4 transfer modes are shown in FIGS. 4, 5A, 5B, 6A, 6B, 7, 8A, 8B, 9A, 9B and 9C. FIGS. 4 and 7 respectively show how FIGS. 5A, 5B, 6A, 6B and FIGS. 8A, 8B, 9A, 9B and 9C are connected together. The combination of logic circuits shown in these figures produces the addresses shown in Tables 1 and 2.

Figure 10:
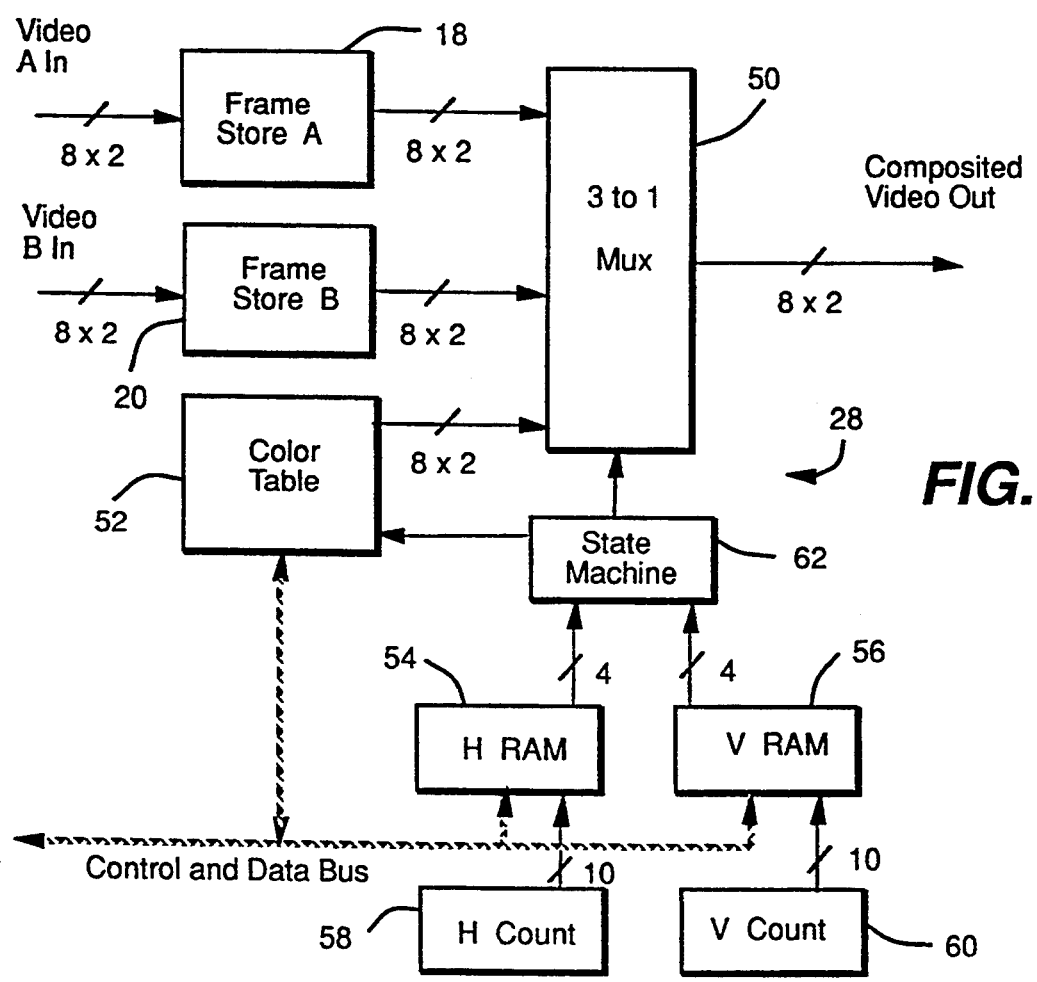

The system 10 allows the use of various wipes, such as vertical, horizontal and rectangular wipes, to provide visual and electronic color comparison. FIG. 10 shows the electronics of the compositor 28 for generating these wipes and for preparing other video image signal outputs from the system. The framestores 18 and 20 respectively provide A and B video signal outputs to a 3:1 multiplexer 50. Video signal information obtained from one of the disks 22 (FIG. 2) via the buffer store 24 is supplied to one of the framestores 18 or 20. A horizontal counter 58 and a vertical counter 60 are respectively connected to RAMs 54 and 56 to produce readout of the information to state machine 62. Information stored in the RAMs 54 and 56 determines the corners of the wipe rectangle. The output of the state machine 62 is supplied to the multiplexer 50. The compositor 28 thus functions as a memory addressing system to prepare the composited video output signals. Table 3 below is a source code listing for the state machine 62.

TABLE 3

```
MODULE    fs_compositor
flag      '-r2'
TITLE     'Field Store -- Composite Control
fs_u179    device 'P22V10';
CLK                              pin 1 ;
VAV, MRKTYPE, VP0                pin 2,3,4 ;
```

TABLE 3-continued

```
VP1, HP0, HP1              pin 5, 6, 7 ;
HAV, COMPEN, MARKEN        pin 8, 9, 10 ;
CBFEN, ABACK               pin 11, 13 ;
ABSWITCH, BRDROE           pin 14, 17 ;
Q0, Q1, Q2, Q3, Q4, Q5     pin 16, 18, 15, 19, 20, 21 ;
MRKOE, DATAOE              pin 22, 23 ;
True, False     = 1,0;
High, Low       = 1,0;
H,L,Q,X         = 1,0,.C.,.X.;
"State Machine State Assignments
S0 = b0000;     S1 = b0001;  S2 = b0010;   S3 = b0011;
S4 = b0100;     S5 = b0101;  S6 = b0110;   S7 = b0111;
S8 = b1000;     S9 = b1001;  S10 = b1010;  S11 = b1011;
S12 = b1100;    S13 = b1101; S14 = b1110;  S15 = b1111;
"State Input Modes
Mode       =  [ VP0, HP0, VP1, HP1 ];
Any        =  [ X,   X,   X,   X   ];
Horz0      =  [ 0,   1,   X,   X   ];
Vert0      =  [ 1,   0,   X,   X   ];
Both0      =  [ 1,   1,   X,   X   ];
Vert1      =  [ X,   X,   1,   0   ];
Horz1      =  [ X,   X,   0,   1   ];
Both1      =  [ X,   X,   1,   1   ];
NBothHorz1 =  [ X,   X,   X,   0   ];
NBothVert0 =  [ 0,   X,   X,   X   ];
equations
DATAOE := !(HAV * VAV * MRKOE * BRDROE );
state_diagram [MRKOE,Q5,Q4,Q3]
    State S15:  case  (Mode = Both1)         :S9 ;
                      (Mode != Both1)        :S15 ;
                endcase ;
    State S9:   case  (Mode != Horz1)        :S9 ;
                      (Mode == Horz1)        :S0 ;
                endcase ;
    State S0:   case  (Mode == Horz1)        :S0 ;
                      (Mode != Horz1)        :S10 ;
                endcase ;
    State S10:  case  (Mode != Horz1)        :S10 ;
                      (Mode == Horz1)        :S11 ;
                endcase ;
    State S11:  case  (Mode == NBothHorz1)   :S11 ;
                      (Mode == Both1)        :S1 ;
                      (Mode == Horz1)        :S9 ;
                endcase ;
    State S1:   case  (Mode != Horz1)        :S1 ;
                      (Mode == Horz1)        :S2 ;
                endcase ;
    State S2:   case  (Mode != Horz1)        :S3 ;
                      (Mode == Horz1)        :S2 ;
                endcase ;
    State S3:   case  (Mode != Horz1)        :S3 ;
                      (Mode == Horz1)        :S12 ;
                endcase ;
    State S12:  case  (Mode == NBothHorz1)   :S12 ;
                      (Mode == Horz1)        :S13 ;
                      (Mode == Both1)        :S1 ;
                endcase ;
    State S13:  case  (Mode == NBothHorz1)   :S13 ;
                      (Mode == Horz1)        :S4 ;
                      (Mode == Vert1)        :S15 ;
                endcase ;
    State S4:   case  (Mode != Horz1)        :S14 ;
                      (Mode == Horz1)        :S4 ;
                endcase ;
    State S14:  case  (Mode != Horz1)        :S14 ;
                      (Mode == Horz1)        :S8 ;
                endcase ;
    State S8:   case  (Mode == Horz1)        :S13 ;
                      (Mode != Horz1)        :S8 ;
                endcase ;
state_diagram [BRDROE,Q2,Q1,Q0]
    State S15:  ABSWITCH = ABACK ;
                case  (Mode == Both0)        :S0 ;
                      (Mode != Both0)        :S15 ;
                endcase ;
    State S0:   ABSWITCH = ABACK ;
                case  (Mode == Vert0)        :S0 ;
                      (Mode != Vert0)        :S1 ;
                endcase ;
    State S1:   ABSWITCH = ABACK ;
                case  (Mode == Vert0)        :S1 ;
                      (Mode != Vert0)        :S2 ;
                endcase ;
    State S2:   ABSWITCH = ABACK ;
                case  (Mode == Vert0)        :S2 ;
                      (Mode != Vert0)        :S9 ;
                endcase ;
    State S9:   ABSWITCH = ABACK ;
                case  (Mode == Both0)        :S0 ;
                      (Mode == Vert0)        :S3 ;
                      (Mode == NBothVert0)   :S9 ;
                endcase ;
    State S3:   ABSWITCH = ABACK ;
                case  (Mode != Vert0)        :S10 ;
                      (Mode == Vert0)        :S3 ;
                endcase ;
    State S10:  ABSWITCH = ABACK $ CBFEN ;
                case  (Mode != Vert0)        :S10 ;
                      (Mode == Vert0)        :S4 ;
                endcase ;
    State S4:   ABSWITCH = ABACK ;
                case  (Mode != Vert0)        :S11 ;
                      (Mode == Vert0)        :S4 ;
                endcase ;
    State S11:  ABSWITCH = ABACK ;
                case  (Mode == Both0)        :S5 ;
                      (Mode == Vert0)        :S3 ;
                      (Mode == NBothVert0)   :S11 ;
                endcase ;
    State S5:   ABSWITCH = ABACK ;
                case  (Mode != Vert0)        :S6 ;
                      (Mode == Vert0)        :S5 ;
                endcase ;
    State S6:   ABSWITCH = ABACK ;
                case  (Mode != Vert0)        :S6 ;
                      (Mode == Vert0)        :S7 ;
                endcase ;
    State S7:   ABSWITCH = ABACK ;
                case  (Mode != Vert0)        :S8 ;
                      (Mode == Vert0)        :S7 ;
                endcase ;
    State S8:   ABSWITCH = ABACK ;
                case  (Mode == Both0)        :S5 ;
                      (Mode == Vert0)        :S0 ;
                      (Mode == NBothVert0)   :S8 ;
                endcase ;
end    fs_compositor
```

Figure 13:
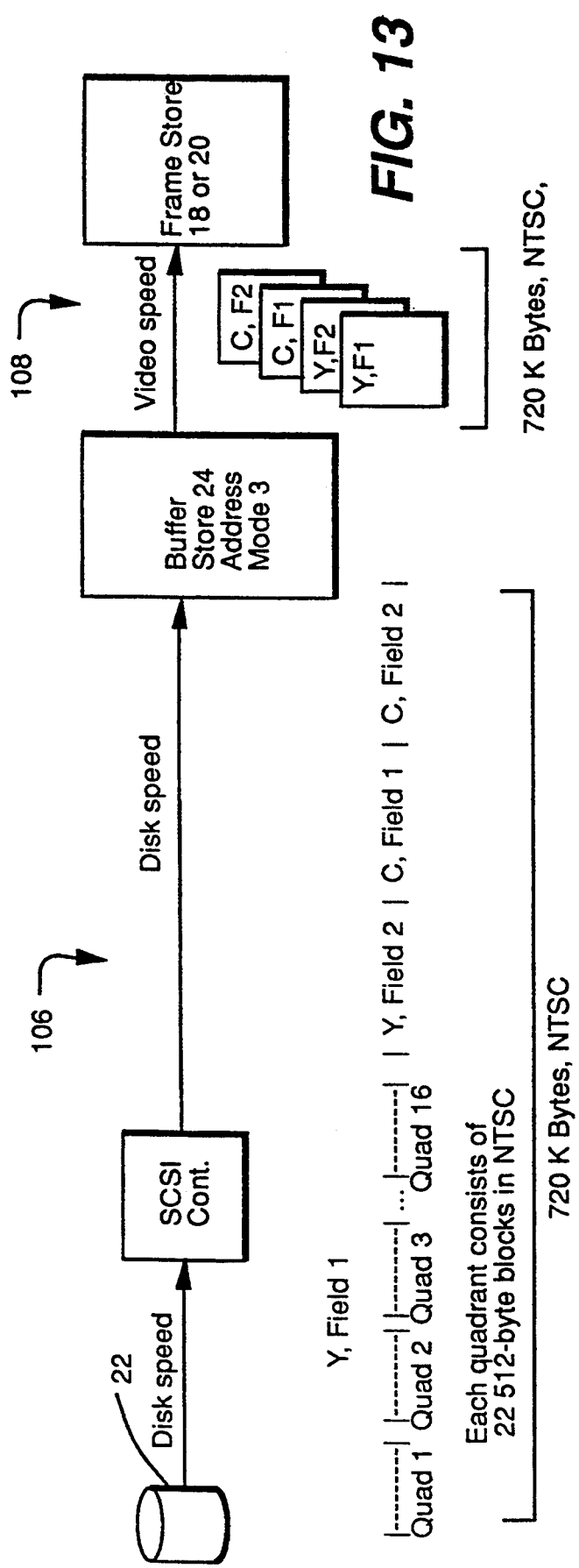

Further details on the operation of the system 10 in the record, playback and browse modes of operation are shown in FIGS. 11, 12 and 13. The record operation is shown in FIG. 11. The steps in recording an image are as follows:

a) Capture (freeze) an image in either framestore 18 or 20, as indicated at 100.

b) Transfer the Y component, field 1, to the buffer store 24, as indicated at 102. This takes one field time = 15 milliseconds (ms.) in NTSC. The buffer store 24 address mode 1) is used. The address generator 31 segments the image into 16 quadrants, each representing 1/16th of the entire image.

c) Transfer quadrant 1 to the disk 22, as indicated at 104. This quadrant becomes 22 512-byte blocks on disk 22, recorded contiguously, and takes 10 ms.

d) Repeat c) above for the remaining 15 quadrants. To transfer all 16 quadrants takes 172 ms. in NTSC.

e) Repeat steps b)-d) in succession for Y field 2; C field 1; and C field 2.

The total record time is 750 ms. The steps in playing back an image are exactly those as in recording, but executed in reverse, as shown in FIG. 12.

The steps to create a browse image are shown in FIG. 13 and are:

a) Locate the upper-left browse picture on disk 22. Transfer the Y field 1 first quadrant into the buffer store 24 into its first quadrant position, as indicated at 106.

b) Locate the picture immediately to its right on disk 22. Transfer its quadrant 1 into the buffer store's second quadrant position.

c) Repeat b) for the remaining 14 browse pictures. Total time is 250 ms.

d) Transfer the now-full buffer store 24 into either framestore 18 or 20's Y field 1 component, as indicated at 108. This takes 16 ms. Use address mode 3.

e) Repeat steps a)–d) in succession for fields Y, field 2; C field 1; and C field 2. Total transfer time is 1 second in NTSC.

Figure 14:
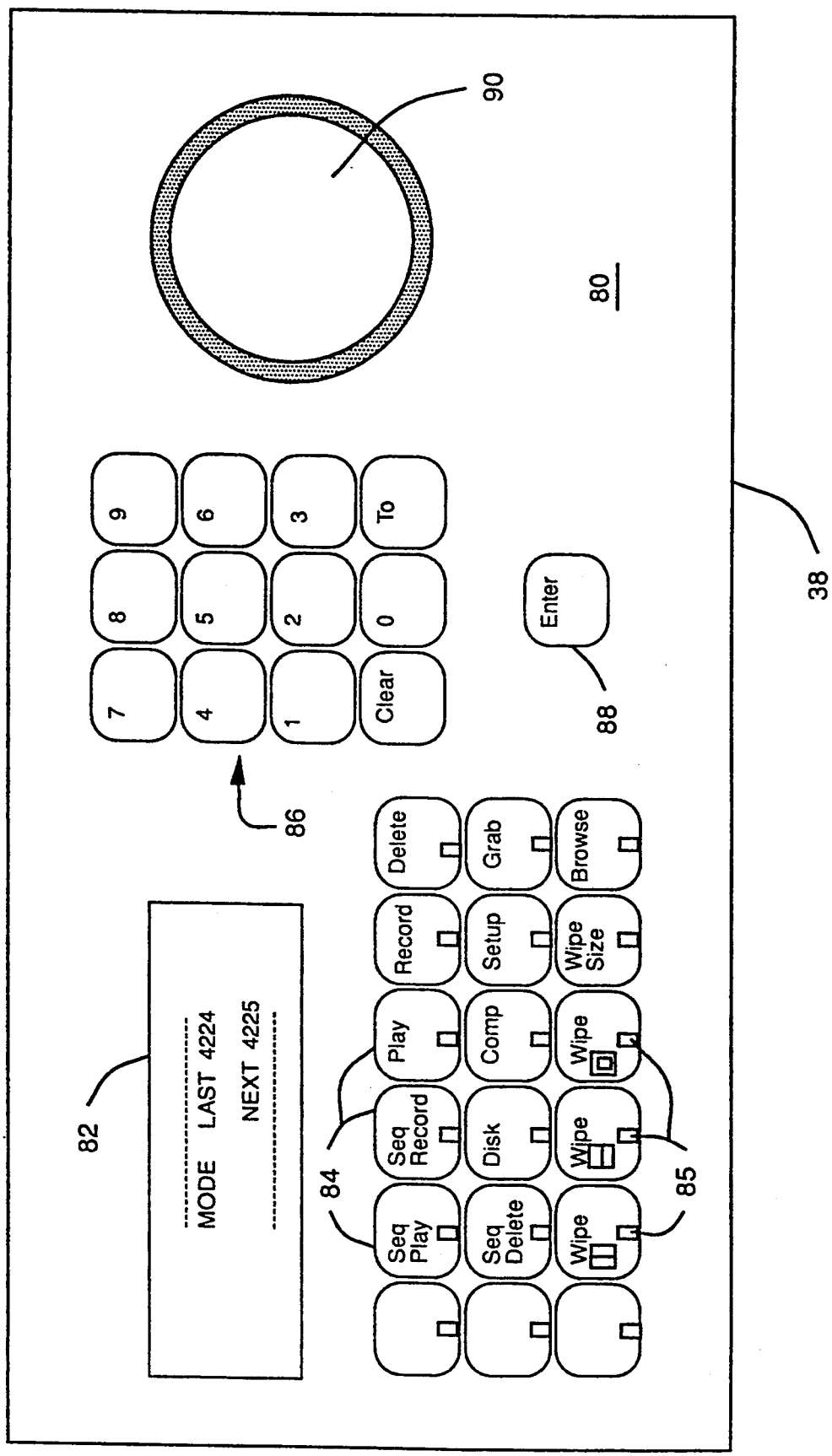
FIG. 14 is a front view of the still store system of FIGS. 1-3, showing a front panel of the system.

FIG. 14 shows a control panel 80 for the system 10. The front panel 80 includes a 20 character by 2 line display 82, a plurality of modal keys 84, a numeric keypad 86, enter key 88, and a trackball 90. The display 82 shows the current operating mode of the system 10, the last picture or item, the next picture or item, and general information for the operation of the system. The format shown below in Table 4 is used for the display 82.

TABLE 4

| MODE | LAST XXXX |
|---|---|
| INFO | NEXT XXXX |

The modal keys 84 are used to select the mode of operation of the system 10. Each modal key 84 has an LED 85 to indicate when its mode is active. The numeric keypad 86 is for entry of numeric values, including picture numbers. The trackball 90 is for selecting pictures in the browse mode, for scrolling selections in system menus shown on the display 82, and for entering values when used in conjunction with the enter key 88. Operations of the system 10 are as follows:

In the PLAY mode, display 82 appears as shown in Table 5.

TABLE 5

| PLAY | LAST 4224 |
|---|---|
|  | NEXT 4225 |

The current picture being shown by the still store system 10 is displayed as the last picture number. The next picture number shows the picture that will be displayed when enter is pushed. When the enter key 88 is pushed, the next picture will be shown. The operator can at any time key in a new number that will be displayed in the next picture location on the display 82. If no picture is stored at the selected location, the information on the display 82 reads as shown in Table 6.

TABLE 6

| PLAY | LAST 4224 |
|---|---|
| NO PICTURE AT 4225 | |

If enter key 88 is then pressed, the system will search and play the next higher number having a stored picture.

In RECORD mode, the information on the display 82 reads as shown in Table 7.

TABLE 7

| RECORD | LAST 4224 |
|---|---|
| 45 | NEXT 4225 |

The 45 in Table 7 indicates the remaining picture slots. After selecting the record mode, a number is entered with the numeric keypad 86. When the enter key is pushed, the current picture being shown by the system is recorded on disk. Recording does not occur where a previous picture is recorded. If the selected location already has a picture recorded there, the display is as shown in Table 8.

TABLE 8

| RECORD | LAST 4224 |
|---|---|
| BUSY NUMBER | 4225 |

The system advances to the next higher number available. Pressing enter records the picture at the next higher number available. The display then appears as shown in Table 9.

TABLE 9

| RECORD | LAST 4226 |
|---|---|
| 44 | NEXT 4227 |

DELETE mode is selected by pressing the delete modal key 84. The display 82 is as shown in Table 10.

TABLE 10

| DELETE | LAST —— |
|---|---|
| 100 | NEXT 4224 |

There is no "last" number shown on the display. The "next" number shows the picture currently in the store. When the enter key 88 is pressed, the system will delete the picture currently in the store off the disk 22 and the "next" number will advance to the next highest number, so that the display appears as shown in Table 11.

TABLE 11

| DELETE | LAST 4224 |
|---|---|
| 101 | NEXT 4225 |

When a new number is keyed in with the keypad 86 and the enter key 88 is pushed, the picture at the location keyed in is recalled from the disk 22 and placed in the store. The picture is erased from the disk. This allows a picture to be rerecorded at the same or different number. If no picture is found at the location keyed in, the display is as shown in Table 12.

TABLE 12

| DELETE | LAST 4224 |
|---|---|
| NO PICTURE AT 4225 | |

Range Delete is a modified form of delete. The system enters this mode when the "To" key in the keypad 86 is used. After pressing the Delete modal key 84, the first picture of the range to be deleted is entered with the keypad 86. The To key is then pressed, and the display changes to the form shown in Table 13.

TABLE 13

| RANGE DEL | FIRST 4000 |
|---|---|
|  | LAST —— |

The last number of the range is then entered with the keypad 86, followed by pressing the Enter key 88. The system responds with the display shown in Table 14.

TABLE 14

| RANGE DEL | FIRST 4000 |
|---|---|
| SURE? | LAST 4010 |

Pressing enter again completes the range delete. In this mode, the system does not recall the pictures into the store, but simply erases them off the disk 22.

The Disk mode is accessed with the Disk modal key 84 and gives access to items associated with the disks 22. All items are accessed by scrolling through a list using the trackball 90. The trackball 90 is right/down to go lower on the list and left/up to go up the list. If a function requires data entry, then the keypad 86 is used. As an alternate, the enter key 88 is held down while the trackball 90 is used to enter a value. Functions accessed in this mode include selecting current drive, copying between fixed or cartridge media, space remaining and disk format.

Setup mode is accessed with the Setup modal key 84 and gives access to items associated with setup of the system 10. All items are accessed by scrolling through a list using the trackball 90. The trackball 90 motion and data entry is the same as for the Disk mode. The setup items include:

1. Recall setup, which brings back the contents of the setup menu previously stored in RAM. This provides for storage of 10 different setup configurations.
2. Record mode, in which the Enter key 88 toggles between automatic record, as shown in Table 15.

TABLE 15

| SETUP | REC ONLY |
|---|---|
| | GRAB & REC | and grab and record, as shown in Table 16.

TABLE 16

| SETUP | GRAB & REC |
|---|---|
| | REC ONLY |

Additional functions which toggle in the same manner with the Enter key 88 include:

3. Grab in field or frame mode.
4. Playback in field or frame mode.
5. Standard as 525 lines or 625 lines.
6. Machine Configuration, i.e., one disk 22 for live video and the other for off disk video or both for off disk video.
7. Sync Source, i.e., internal or external.
8. Input Select as serial or parallel. Other functions include:
9. Test Signals
10. Diagnostics
11. Timing, which allows selection of horizontal timing using the display shown in Table 17.

TABLE 17

| SETUP | nSEC XXXX |
|---|---|
| | HORIZONTAL TIMING |

12. Dim Display
13. Dim Button LEDs Functions 12 and 13 allow brightness selection on a scale of 1 to 100.
14. Record Setup, which records the contents of the setup menu in RAM, using the display in Table 18.

TABLE 18

| SETUP | CURRENT 9 |
|---|---|
| | RECORD SETUP 0-9 X |

Grab mode is selected with the Grab modal key 84 to grab live video. This mode only works when the system 10 is in the Live store mode.

There are four wipe modes, respectively selected by the four Wipe modal keys 84 shown from left to right in the bottom row of modal keys. Selecting the wipe modes enables the operator to compare live video to store video or the video from two stores. Selecting wipes cancels the Browse, Disk, Setup and Delete modes. Selecting wipes does not change the appearance of any displays. Horizontal Wipe enables the trackball 90 to move the wipe in the left to right direction. Vertical Wipe enables the trackball to move the wipe in the top to bottom direction. Horizontal and Vertical Wipe can be on together. Box Wipe enables the trackball to move the box wipe anywhere on screen. Wipe Size enables the trackball to control the size of the wipe on screen.

Compare mode is accessed with the Compare modal key 84 and allows the operator to compare the RGB values of any two locations on screen. When the Compare modal key is pressed, the display 82 is as shown in Table 19.

TABLE 19

| COMPARE |
|---|
| SELECT FIRST COLOR |

When the trackball 90 moves, the display changes as shown in Table 20.

TABLE 20

| R100.0 | G100.0 | B100.0 |
|---|---|---|
| | ENTER FOR NEXT COLOR | |

The operator then moves the trackball to the first color in the image. The upper RGB values follow the cursor on the image. When the Enter key 88 is pressed, the display appears as shown in Table 21.

TABLE 21

| R100.0 | G100.0 | B100.0 |
|---|---|---|
| R100.0 | G100.0 | B100.0 |

The trackball 90 now increments the lower RGB values. Pressing the Enter key 88 again returns the operator to the upper values.

In order to do the electronic color comparison, the computer determines which framestore 18 or 20 is holding the image being pointed at by the cursor on the screen. That image is copied into the buffer store 24. The computer then reads out the pixel color value at the address value corresponding to the pixel pointed at on the screen. To improve noise immunity, local averaging of the pixels is employed.

Browse mode is accessed with the Browse modal key 84. When this key is pressed, the display 82 appears as shown in Table 22.

TABLE 22

| BROWSE | LAST XXXX |
|---|---|
| | NEXT XXXX |

The "Last" area on the display shows the current picture number in the store. The "Next" area shows the picture number that the cursor is on. The operator moves the cursor over the array of pictures on the screen with the trackball 90 and presses the Enter key 88 to select a picture. The system 10 then leaves the Browse mode, enters the Play mode, and the selected picture is recalled from the disk 22 on which it is stored. After the picture is played, it can be deleted by pressing Delete followed by the Enter key 88.

Attached hereto and forming a part of this application is an appendix consisting of source code and data files used in operation of the system 10.

It should now be readily apparent to those skilled in the art that a still store system and method capable of achieving the stated objects of the invention has been provided. The still store system and method does not require image data processing for display of reduced size images. It further does not require storage of images in both full size and reduced size in order to allow selective display of reduced size images. The still store system and method allows convenient visual and electronic color comparison of images. The control system of the still store system and method is easy to use.

It should further be apparent to those skilled in the art that various changes in form and details of the invention as shown and described may be made. It is intended that such changes be included within the spirit and scope of the claims appended hereto.

What is claimed is:

1. A system for storing and retrieving information representing a multiplicity of video image frames consisting of a plurality of pixels, which comprises at least one framestore for storing frames of video signals connected to a video image signal input, at least one bulk video image signal store for a plurality of video images, a buffer store connected to supply video image signals between said at least one framestore and said at least one bulk video image signal store, said buffer store being connected to receive video image signals from said at least one framestore, said buffer store having an address control for storing video image signals in said at least one bulk video image signal store in a predetermined manner in a plurality of pixel storage locations and selectively retrieving video image signals, from said at least one bulk video image signal store, for supply to said framestore, for full-size video image frames by addressing sequential pixel storage locations and reduced-size images by addressing one out of a given number of sequential pixel storage locations for the plurality of pixels in full-size video image frames, to provide output video signals selectively for full-size video image frames and reduced-size images as an image frame without image data processing to modify video image signals, said address control being configured to store the video image signals in said at least one bulk video image signal store in the predetermined manner with a storing operation by dividing a video image frame into N subregions, storing one of every X pixels from a given starting point of the video image signals in the video image frame in a first one of the N subregions contiguously in said at least one bulk video image signal store, incrementing from the given starting point of the video image signals by one pixel to a new starting point of the video image signals in the video image frame, storing one of every X pixels from the incremented starting point of the video image signals in the video image frame in a second one of the N subregions contiguously in said at least one bulk video image signal store, and repeating the incrementing and storing until the Nth one of the N subregions is reached, where N and X are integers, said address control being further configured to provide the output video signals for full sized video image frames from said at least one bulk video image store by reversing the storing operation, said address control being further configured to provide the output video signals for the reduced size images by retrieving one of the N subregions stored in said at least one bulk video image store for each of the reduced size images.

2. The system for storing and retrieving information representing a multiplicity of video image frames of claim 1 in which said at least one framestore includes a first framestore and a second framestore, said system having control means for accessing said first framestore and said second framestore selectively.

3. The system for storing and retrieving information representing a multiplicity of video image frames of claim 1 in which said at least one bulk video image signal store comprises a disk store.

4. The system for storing and retrieving information representing a multiplicity of video image frames of claim 1 in which the video image signals are digital signals.

5. The system for storing and retrieving information representing a multiplicity of video image frames of claim 1 additionally comprising a control means for supplying video image signals as a frame comprising at least a first image and a second image.

6. The system for storing and retrieving information representing a multiplicity of video image frames of claim 5 in which said control means is further for supplying an electronic comparison of a portion of the first image and a portion of the second image.

7. The system for storing and retrieving information representing a multiplicity of video image frames of claim 5 in which said control means includes a plurality of modal keys for selecting from a plurality of operating modes for said system, a plurality of keys for entering values identifying image frames, a system control display, and a means for moving a cursor in the image frames when displayed on a video display.

8. The system for storing and retrieving information representing a multiplicity of video image frames of claim 7 in which said means for moving the cursor further is for scrolling selections in said system control display.

9. The system for storing and retrieving information representing a multiplicity of video image frames of claim 1 in which said address control is configured to provide the reduced-size images as an array.

10. The system for storing and retrieving information representing a multiplicity of video image frames of claim 1 additionally comprising an input for external control of said system.

11. The system for storing and retrieving information representing a multiplicity of video image frames of claim 10 in which said input for external control of said system includes means for providing additional information for storage with video image signals.

12. A method for storing and retrieving information representing a multiplicity of video image frames consisting of a plurality of pixels, which comprises receiving video image signals defining the video image frames in at least one framestore, storing the video image signals in a bulk storage means in a predetermined manner in a plurality of pixel storage locations, retrieving the video image signals from the bulk storage means, applying the video image signals to the at least one framestore and supplying the video image signals from the at least one framestore selectively as full-size video image frames by addressing sequential pixel storage locations and reduced-size images by addressing one out of a given number of sequential pixel storage locations for the plurality of pixels in the full-size video image frames, and providing output video signals selectively for the full-size video image frames for the reduced-size images as an image frame, the video image signals being stored in the bulk storage means with a storing operation by dividing a video image frame into N subregions, storing one of every X pixels from a given starting point of the video image signals in the video image frame in a first one of the N subregions contiguously in the bulk storage means, incrementing from the given starting point of the video image signals by one pixel to a new starting point of the video image signals in the video image frame, storing one of every X pixels from the incremented starting point of the video image signals in the video image frame in a second one of the N subregions contiguously in the bulk storage means, and repeating the incrementing and storing until the Nth one of the N subregions is reached, where N and X are integers, said address control being further configured to provide the output video signals for full sized video image frames from the bulk storage means by reversing the storing operation, said address control being further configured to provide the output video signals for the reduced size images by retrieving one of the N subregions stored in the bulk storage means for each of the reduced size images.

13. The method for storing and retrieving information representing a multiplicity of video image frames of claim 12 in which the video image signals are selectively received by a first framestore and a second framestore comprising the at least one framestore.

14. The method for storing and retrieving information representing a multiplicity of video image frames of claim 12 in which the video image signals are supplied as a frame comprising at least a first image and a second image.

15. The method for storing and retrieving information representing a multiplicity of video image frames of claim 14 additionally comprising supplying an electronic comparison of a portion of the first image and a portion of the second image.

16. The method for storing and retrieving information representing a multiplicity of video image frames of claim 12 in which the reduced-size images are provided as an array in an image frame.

17. The method for storing and retrieving information representing a multiplicity of video image frames of claim 12 in which additional information for an image is stored with the video image signals.

18. The system for storing and retrieving information representing a multiplicity of video image frames of claim 1 in which N is equal to X squared.

19. The system for storing and retrieving information representing a multiplicity of video image frames of claim 18 in which N is 16 and X is 4.

20. The method for storing and retrieving information representing a multiplicity of video image frames of claim 12 in which N is equal to X squared.

21. The method for storing and retrieving information representing a multiplicity of video image frames of claim 20 in which N is 16 and X is 4.

* * * * *